(12) United States Patent
Guo et al.

(10) Patent No.: US 8,239,393 B1
(45) Date of Patent: Aug. 7, 2012

(54) DISTRIBUTION FOR ONLINE LISTINGS

(75) Inventors: Huimin Guo, Stoughton, MA (US); Sivakumar Chinnasamy, Billerica, MA (US); Tsu-Jung Kung, Concord, MA (US); Mitchell Willingham, Flower Mound, TX (US); Alexander Shulman, Newton, MA (US); James D. Price, Allen, TX (US); Sean M. Freeman, Carrollton, TX (US)

(73) Assignee: SuperMedia LLC, DFW Airport, TX (US)

( * ) Notice: Subject to any disclaimer, the term of this patent is extended or adjusted under 35 U.S.C. 154(b) by 0 days.

(21) Appl. No.: 12/640,155

(22) Filed: Dec. 17, 2009

Related U.S. Application Data

(63) Continuation-in-part of application No. 12/248,722, filed on Oct. 9, 2008.

(51) Int. Cl.
*G06F 7/00* (2006.01)

(52) U.S. Cl. .................. 707/748; 707/752; 707/754

(58) Field of Classification Search .................. 707/748
See application file for complete search history.

(56) References Cited

U.S. PATENT DOCUMENTS

| | | | |
|---|---|---|---|
| 5,819,291 A | 10/1998 | Haimowitz et al. | |
| 6,006,197 A | 12/1999 | d'Eon et al. | |
| 6,487,538 B1 | 11/2002 | Gupta et al. | |
| 6,567,857 B1 | 5/2003 | Gupta et al. | |
| 6,662,215 B1 | 12/2003 | Moskowitz et al. | |
| 6,912,571 B1 | 6/2005 | Serena | |
| 6,973,436 B1 | 12/2005 | Shkedi et al. | |
| 6,985,882 B1 | 1/2006 | Del Sesto | |
| 6,993,476 B1 | 1/2006 | Dutta et al. | |
| 7,631,008 B2 * | 12/2009 | Carson et al. | 705/14.45 |
| 7,873,536 B2 | 1/2011 | Desikan et al. | |
| 2001/0014868 A1 | 8/2001 | Herz et al. | |
| 2002/0042738 A1 | 4/2002 | Srinivasan et al. | |
| 2002/0099600 A1 | 7/2002 | Merriman et al. | |
| 2002/0128908 A1 | 9/2002 | Levin et al. | |
| 2003/0014304 A1 | 1/2003 | Calvert et al. | |
| 2003/0018501 A1 | 1/2003 | Shan | |
| 2003/0023489 A1 | 1/2003 | McGuire et al. | |

(Continued)

FOREIGN PATENT DOCUMENTS

KR 20020038244 5/2002

OTHER PUBLICATIONS

Non-Final Office Action dated Feb. 3, 2010 in U.S. Appl. No. 12/248,722 (26 pages).

(Continued)

*Primary Examiner* — Charles Rones
*Assistant Examiner* — Mellissa M Chojnacki
(74) *Attorney, Agent, or Firm* — Rader, Fishman & Grauer PLLC

(57) ABSTRACT

User actions responsive to a plurality of web pages are tracked and included in records in a data store. A conversion score is calculated for each traffic source of a plurality of traffic sources, the conversion score based at least in part on the tracked user actions. A traffic source quality score is calculated for each of the plurality of traffic sources, and the plurality of traffic sources are ranked based at least in part on the traffic source quality scores. The traffic sources are allocated to sets based at least in part on the ranking.

23 Claims, 16 Drawing Sheets

U.S. PATENT DOCUMENTS

| | | | |
|---|---|---|---|
| 2003/0023511 A1 | 1/2003 | Gardner | |
| 2003/0110080 A1 | 6/2003 | Tsutani et al. | |
| 2003/0171990 A1 | 9/2003 | Rao et al. | |
| 2004/0030597 A1 | 2/2004 | Bibas | |
| 2004/0123247 A1 | 6/2004 | Wachen et al. | |
| 2004/0243676 A1 | 12/2004 | Blankenship | |
| 2005/0050548 A1 | 3/2005 | Sheinis et al. | |
| 2005/0071224 A1 | 3/2005 | Fikes et al. | |
| 2005/0119934 A1 | 6/2005 | Kamiyama | |
| 2005/0182676 A1 | 8/2005 | Chan | |
| 2005/0251496 A1 | 11/2005 | DeCoste et al. | |
| 2006/0074749 A1 | 4/2006 | Kline et al. | |
| 2006/0074751 A1 | 4/2006 | Kline et al. | |
| 2006/0229938 A1* | 10/2006 | Yan | 705/14 |
| 2006/0271671 A1 | 11/2006 | Hansen | |
| 2007/0050204 A1 | 3/2007 | Ranka et al. | |
| 2007/0055739 A1 | 3/2007 | Marmor | |
| 2007/0129995 A1 | 6/2007 | Brandow | |
| 2007/0179845 A1* | 8/2007 | Jain | 705/14 |
| 2007/0179857 A1* | 8/2007 | Collins | 705/14 |
| 2007/0239528 A1 | 10/2007 | Xie et al. | |
| 2008/0195462 A1* | 8/2008 | Magdon-Ismail et al. | 705/10 |
| 2008/0255915 A1 | 10/2008 | Collins et al. | |
| 2008/0306830 A1* | 12/2008 | Lasa et al. | 705/26 |
| 2009/0048902 A1 | 2/2009 | Lynn et al. | |
| 2009/0171728 A1 | 7/2009 | Yan et al. | |
| 2009/0254410 A1 | 10/2009 | Chang et al. | |
| 2009/0265622 A1 | 10/2009 | Hickman | |
| 2009/0292677 A1* | 11/2009 | Kim | 707/3 |
| 2009/0299998 A1* | 12/2009 | Kim | 707/5 |
| 2010/0094878 A1* | 4/2010 | Soroca et al. | 707/748 |

OTHER PUBLICATIONS

Response to Feb. 3, 2011 Non-Final Office Action in U.S. Appl. No. 12/248,722 (16 pages).
Final Office Action dated Jul. 1, 2011 in U.S. Appl. No. 12/248,722 (24 pages).
Response to Jul. 1, 2011 Final Office Action in U.S. Appl. No. 12/248,722 (15 pages).
Response to Sep. 29, 2011 Non-Final Office Action for U.S. Appl. No. 12/640,099 (12 pages).
Examiner's Answer dated Dec. 23, 2011 for U.S. Appl. No. 12/248,722 (23 pages).
Final Office Action dated Dec. 27, 2011 for U.S. Appl. No. 12/640,099 (19 pages).
Reply Brief dated Feb. 21, 2012 for U.S. Appl. No. 12/248,722 (8 pages).
Response to Dec. 27, 2011 Final Office Action for U.S. Appl. No. 12/640,099 (13 pages).
Advisory Action dated Mar. 7, 2012 for U.S. Appl. No. 12/640,099 (4 pages).
Advisory Action dated Sep. 7, 2011 in U.S. Appl. No. 12/248,722 (5 pages).
Appeal Brief dated Oct. 19, 2011 in U.S. Appl. No. 12/248,722 (29 pages).
Non-Final Office Action dated Sep. 29, 2011 in U.S. Appl. No. 12/640,099 (24 pages).

* cited by examiner

DISTRIBUTION FOR ONLINE LISTINGS

RELATED APPLICATION

This application is a Continuation-in-part of co-pending U.S. application Ser. No. 12/248,722, filed on Oct. 9, 2008, which application is hereby incorporated by reference herein in its entirety.

BACKGROUND

With the proliferation of the World Wide Web and data networks such as the Internet, consumers often turn to their computers when searching for information relating to products or places, rather than using traditional printed directories. Online search engines, directories of advertisers, and the like, often charge advertisers to have listings included in a set of search results. In some circumstances, an advertiser pays for a listing or an advertisement to be displayed on a webpage that does not include a set of search results. In this case, an advertiser is charged simply for having the advertisement displayed on the webpage. Further, advertisers are often charged on a per-click basis, meaning that every time an online user clicks on an advertisement, the advertiser is charged.

From the perspective of the advertiser and from the perspective of an advertising provider, simply tracking user responses to advertisements does not always provide sufficient detail concerning a user's actions, and does not permit a fine tuning of the amount that an advertiser pays for an advertisement, or for a listing that is included in a set of search results.

DETAILED DESCRIPTION

Overview

Figure 1:
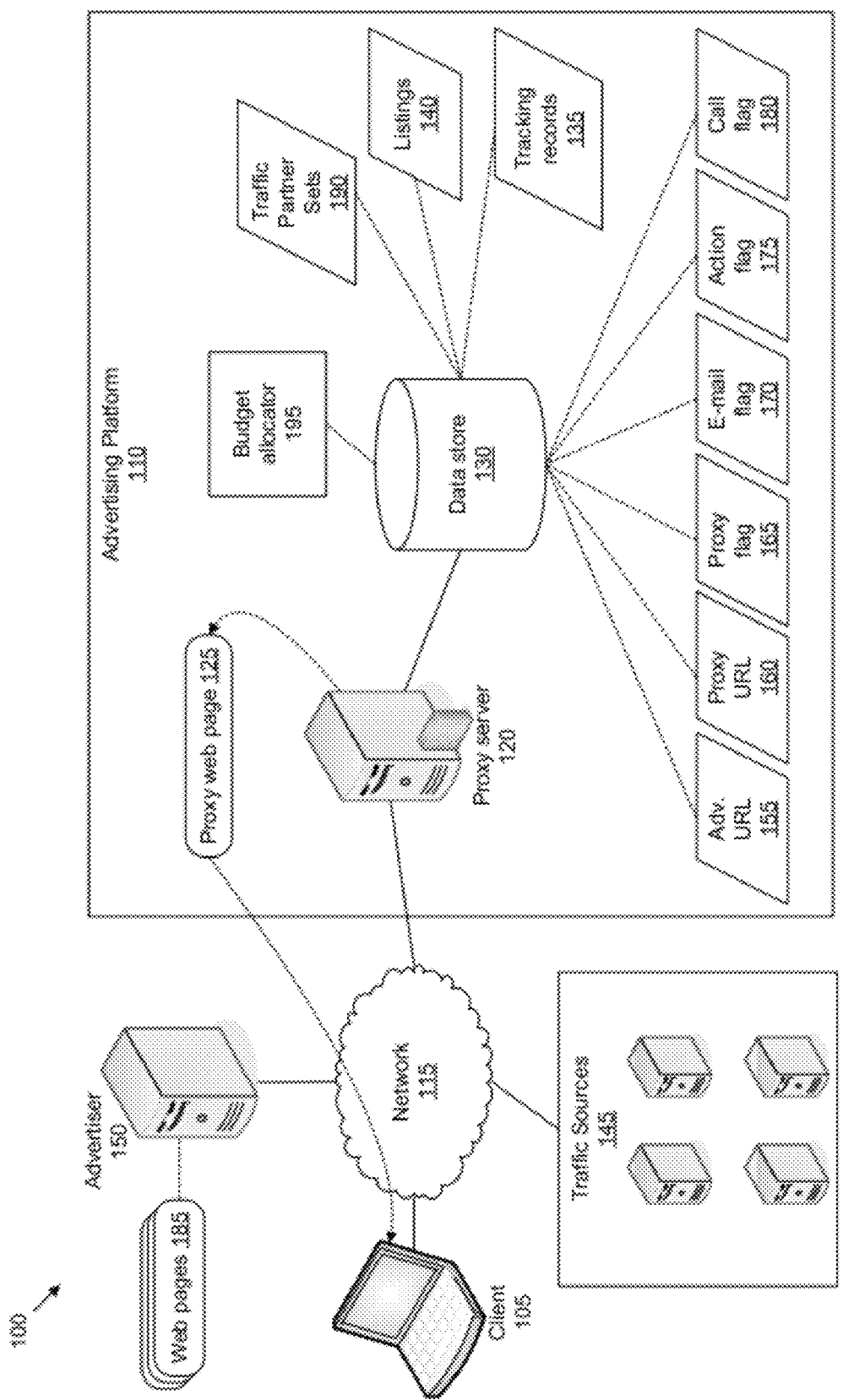
FIG. 1 illustrates an exemplary advertising distribution system.

FIG. 1 illustrates an exemplary advertising distribution system 100 in which a client 105 may communicate with an advertising platform 110 through a network 115. Client 105 may be any one of a number of computing devices that allow a user to communicate via network 115. For example, client 105 may include a desktop computer, a laptop computer, a mainframe computer, a mini-computer, a cell phone, personal digital assistant, or other similar device. Client 105 may also include one or more software applications for facilitating such communication over network 115, e.g., a web browser or the like. In addition, while only one client 105 is shown in FIG. 1, many different clients 105 may be connected to network 115 and submit queries and receive responses using system 100. Likewise, network 115 is generally but not necessarily a packet network, and may be any suitable network for sending and receiving data, such as the Internet, local area network, wide area network, cellular network, etc.

Advertising platform 110 or components thereof, such as proxy server 120, may communicate directly or indirectly through network 115 to other system 100 components such as, but not limited to, advertiser 150 and traffic sources 145. Further, advertising platform 110, generally via a server 120, may provide one or more proxy web pages 125 to client 105, generally via network 115. Server 120 is generally in communication with a data store 130.

Server 120 is described herein as a "server" for convenience, and not by way of limitation, and may include any general-purpose computing device along with operating software and other sets of computer executable instructions to carry out steps described herein. In one exemplary implementation, server 120 includes features of a content-changing dynamic proxy server, sometimes referred to as a reverse proxy server. In general, a reverse proxy server receives a request for content, e.g., a webpage, queries a source for the content, and provides the content in response to the request, sometimes altering certain of the content, thereby providing a proxy web page 125. A reverse proxy process, and reverse proxy web pages 125, is described in more detail below with respect to FIG. 2.

Although not illustrated in FIG. 1, server 120 and data store 130 may be included within a single computing device, or, as illustrated in FIG. 1, may be included on separate computing devices. Further, each may include clusters of computing devices for purposes of redundancy, processing efficiency, etc. As noted above, in addition to providing reverse proxy features, server 120 generally also includes one or more sets of computer executable instructions for providing other operations such as described herein.

As mentioned above, data store 130 may be included in a separate computing device other than server 120, or may be a software application executing on server 120. In the example shown in FIG. 1, data store 130 includes action tracking records 135 that store information relating to client 105 inputs in response to a listing, webpage, etc. For example, records 135 may include records concerning a hyperlink selected according to input from client 105, time spent by client 105 on a particular webpage, information provided by client 105 in response to an input form, etc.

Data store 130 further includes a plurality of listings 140 that may be provided in response to a user search query, such query possibly submitted via a traffic source 145. Each listing 140 generally relates to a particular advertiser 150 (although note that an advertiser 150 may be associated with multiple listings 140). In general, advertiser 150 maintains web pages 185 or the like that provide information about the advertiser 150. A listing 140 may also include information about the advertiser 150, generally a more limited set of information, such as, without limitation, some or all of the following: a name, address, telephone number, e-mail address, web site address, brief description, etc. Further, a listing 140 may include one or more hyperlinks, some or all of which may be associated with one or more of the foregoing information included in the listing. When a user selects one of the hyperlinks, platform 110 may record a charge to the advertiser 150. In some implementations, listings 140 are banner advertisements, and moreover in some implementations listings 140 may include both listings with text and images as well as advertisements that include only image data. Certain advantageous mechanisms for computing and/or determining such charge are discussed further herein below.

Further, generally included in data store 130 are records including an advertiser URL 155, a proxy URL 160, a proxy flag 165, an e-mail flag 170, an action tracking flag 175, and a call tracking flag 180.

Advertiser URL 155 is a uniform resource locator or some other address used to locate advertiser 150 on network 115.

Proxy URL 160 is a uniform resource locator or some other address used to provide a reverse proxy webpage or the like in response to a request for advertiser URL 155. That is, as described further below, advertiser URL 155 is generally not made available to client 105 in a listing 140. Instead, one or more advertiser URLs 155 may be embedded in one or more proxy URLs 160 included in a listing 140.

Proxy flag 165 is a binary flag, e.g., yes/no, on/off, etc., indicating whether an advertiser 150 has selected to provide reverse proxy webpages. If proxy flag 165 is set to "no" or the like, proxy URL 160, e-mail flag 170, action tracking flag 175, and call tracking flag 180 may all be empty fields.

E-mail flag 170 is a binary flag, e.g., yes/no, on/off, etc., indicating whether a reverse proxy webpage should include a tracking e-mail address. That is, when a reverse proxy webpage is provided, an e-mail address in the webpage may be substituted for by a special e-mail address, depending on a setting of e-mail flag 170.

Action tracking flag 175 is a binary flag, e.g., yes/no, on/off, etc., indicating whether input from client 105 is to be tracked.

Call tracking flag 180 is a binary flag, e.g., yes/no, on/off, etc., indicating whether a reverse proxy webpage should include a tracking telephone number. That is, when a reverse tracking proxy webpage is provided, a telephone number in the webpage may be substituted for by special telephone number, depending on a setting of call tracking flag 180.

Each of advertiser URL 155, proxy URL 160, proxy flag 165, e-mail flag 170, action tracking flag 175, and call tracking flag 180, along with action tracking records 135, is generally associated with an advertiser 150. In some cases, one or all of the following may be associated with an advertiser 150 in combination with a traffic source 145. In particular, proxy URL 160 may be associated with an advertiser 150 in combination with a traffic source 145, i.e., to track activity with respect to particular traffic sources 145, it may be advantageous to establish a proxy URL 160 for each traffic source 145 that may provide queries generating listings 140 that may include information about an advertiser 150, including the advertiser URL 155. As alluded to above, one or more proxy URLs 160 may be included in a listing 140. Further, a proxy URL 160 may embed or have encoded an advertiser URL 155. Thus, for example, when a user selects a link including proxy URL 160, upon receiving such selection proxy server 120 may then provide a proxy web page 125 according to an advertiser URL 155 embedded in the proxy URL 160. An advertiser URL 155 is generally not made available to client 105, or is at least obscured or provided in an obscure manner, because a goal of advertising platform 110 is to prevent client 105 from accessing a web site of advertiser 150 directly, rather than through a listing provided by the platform 110.

Advertiser 150 may be an online merchant, a website, or other entity wishing to utilize listings 140. Advertiser 150 generally is associated with a web site that includes one or more advertiser web pages 185.

Traffic source 145 is any web site or the like that refers traffic, e.g., search queries and the like, to advertising platform 110. For example, traffic source 145 could be an advertiser 150, an online directory, an online merchant, or any website or the like that includes an interface for submitting queries to advertising platform 110. For example, traffic source 145 could include an input form for submitting queries through client 105, such that when queries are submitted they are sent back to server 120 and/or data store 130 to retrieve listings 140. Further, listings 140 may be returned to a traffic source 145 for display within a web page or other interface presented by the traffic source 145. In some cases, a traffic source 145 may be referred to as a "partner," or a "traffic partner."

In addition to elements mentioned above, data store 130 may also include traffic partner sets 190. Further, tracking records 135 may include records for partner sets 190. A traffic partner set 190 includes one or more traffic partners 145. Sets 190 may be useful, for example, when dealing with a large number of traffic partners 145, e.g., when maintaining tracking records 135 for each of the traffic partners 145 consumes large amounts of computational resources, e.g., memory and processing power. That is, grouping traffic partners 145 into a partner set 190 allows tracking for the partner set 190 as a unit, thereby conserving resources. Partner sets 190 may additionally or alternatively be useful for grouping traffic partners 145 according to one or more common characteristics, e.g. partner sets 190 may be generated by assigning traffic partners 145 to a partner set 190 according to a quality score.

Budget allocator 195 is a module that operates to distribute a budget across traffic sources 145 and/or traffic partner sets 190. A budget may represent a dollar amount, or may represent an allowance for various activities related to traffic sources 145 or traffic partner sets 190, such as a maximum number of listings 140 to deliver via traffic source 145 or via one of the traffic sources 145 in a partner set 190, or a maximum number of listings 140 to deliver to a particular client 105 or set of clients 105. The budget is generally specified by the advertiser 150, however, platform 110 may also specify budgets. Budgets may be stored in data store 130. Budget allocator 195 may be operated concurrently or substantially concurrently with the delivery of listings 140 to clients 105 from data store 130. Budget allocator 195 may alternatively be operated at any time without relation to delivery of listings 140, results of such operation being stored, e.g., in data store 130 for later use. Budget allocator 195 may be stored and may run on any of the computing devices of platform 110. Budget allocator 195 is described in more detail below with reference to FIGS. 7-11.

Although communication from advertising platform 110 with other elements in system 100 is illustrated in FIG. 1 as being through network 115, it should be understood that system 100 may include other data networks (not shown) through which communication may be established. It should further be understood that various implementations of the system 100 may include a variety of components, information types, and interactions, including, but in no way limited to, those explicitly mentioned herein.

Computing devices such as those discussed herein generally each include instructions executable by one or more processors. For example, processes disclosed herein may be implemented as sets of instructions stored in memories or other media of computers such as server 120, etc., and executable by one or more processors included in such computers. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, tangible media such as a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein, including data store 130, may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language.

Reverse Proxying

Figure 2:
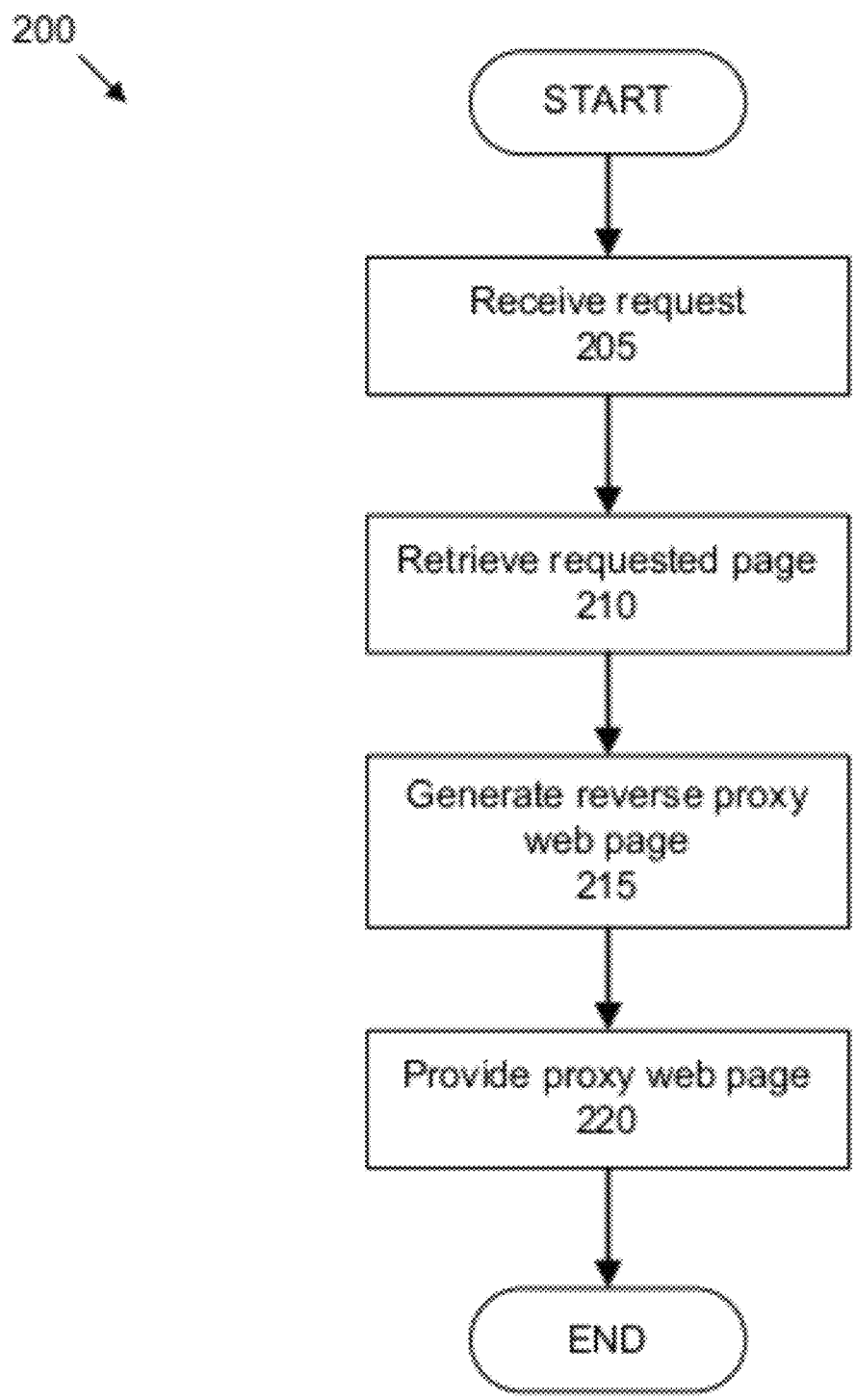
FIG. 2 illustrates an exemplary reverse proxy process.

FIG. 2 illustrates an exemplary reverse proxy process 200, in which a reverse proxy web page 125 is provided to client 105.

Process 200 begins in a step 205, in which server 120 receives a request for content from client 105, e.g., by receiving a request for a uniform resource locator such as a proxy URL 160. Such request may be provided by a client 105 selection of a hyperlink or the like in a listing 140. Further, such listing 140 may be displayed by a traffic partner 145 in a web page or other interface, or in a web page or other interface provided by server 120 or some other element in platform 110.

Next, in step 210, server 120 retrieves the requested content, e.g., by submitting a request to advertiser 150 for a requested advertiser URL 155. As noted above, an advertiser URL 155 could be embedded or encoded in a proxy URL 160. Alternatively, Proxy URL 160 could include an identifier, code, etc. that proxy server 120 could use to look up and retrieve the requested content, e.g., content associated with an advertiser URL 155.

Next, in step 215, server 120 generates reverse proxy web page 125. To do so, server 120 may perform substitutions to the requested content that has been retrieved from the content source such as advertiser 150. Note that step 215 is optional, i.e., server 120 may be programmed not to perform any such substitutions. Exemplary substitutions may include locating telephone numbers, e-mail addresses, and other contact information in the requested content, and substituting other contact information for the contact information originally provided by the requested content. Such other contact information, e.g., special telephone numbers, e-mail addresses, etc., may be used to track clients 105 that have requested content from advertiser 150 through server 120, as opposed to requesting content directly from the advertiser 150 or through some other mechanism.

Similarly, such specialized contact information may be used to identify a traffic source 145 through whom a request for content of advertiser 150 was made. For example, when a user selects a special telephone number or e-mail address, use of the telephone number or e-mail address may cause a notation to be made in data store 130 that the telephone number or e-mail address was selected, the date and time it was selected, among other information. With respect to a telephone number, a telecommunications provider may provide a message to advertising platform 110 when the telephone number is called, whereby platform 110, e.g., according to instructions stored in proxy server 120, may cause the appropriate notations to be made, e.g., a record to be added, in data store 130. Similarly, with respect to an e-mail, sending an e-mail to a special e-mail address may cause a mail server to provide a message to platform 110, e.g., to the server 120, whereby the server 120 will cause an appropriate notation, e.g. a record, to be added to data store 130.

Next, in step 220, reverse server 120 provides reverse proxy web page 125, including any substitutions made as described above with respect to step 215, to client 105.

Following step 220, process 200 ends.

Action Tracking

Figure 3:
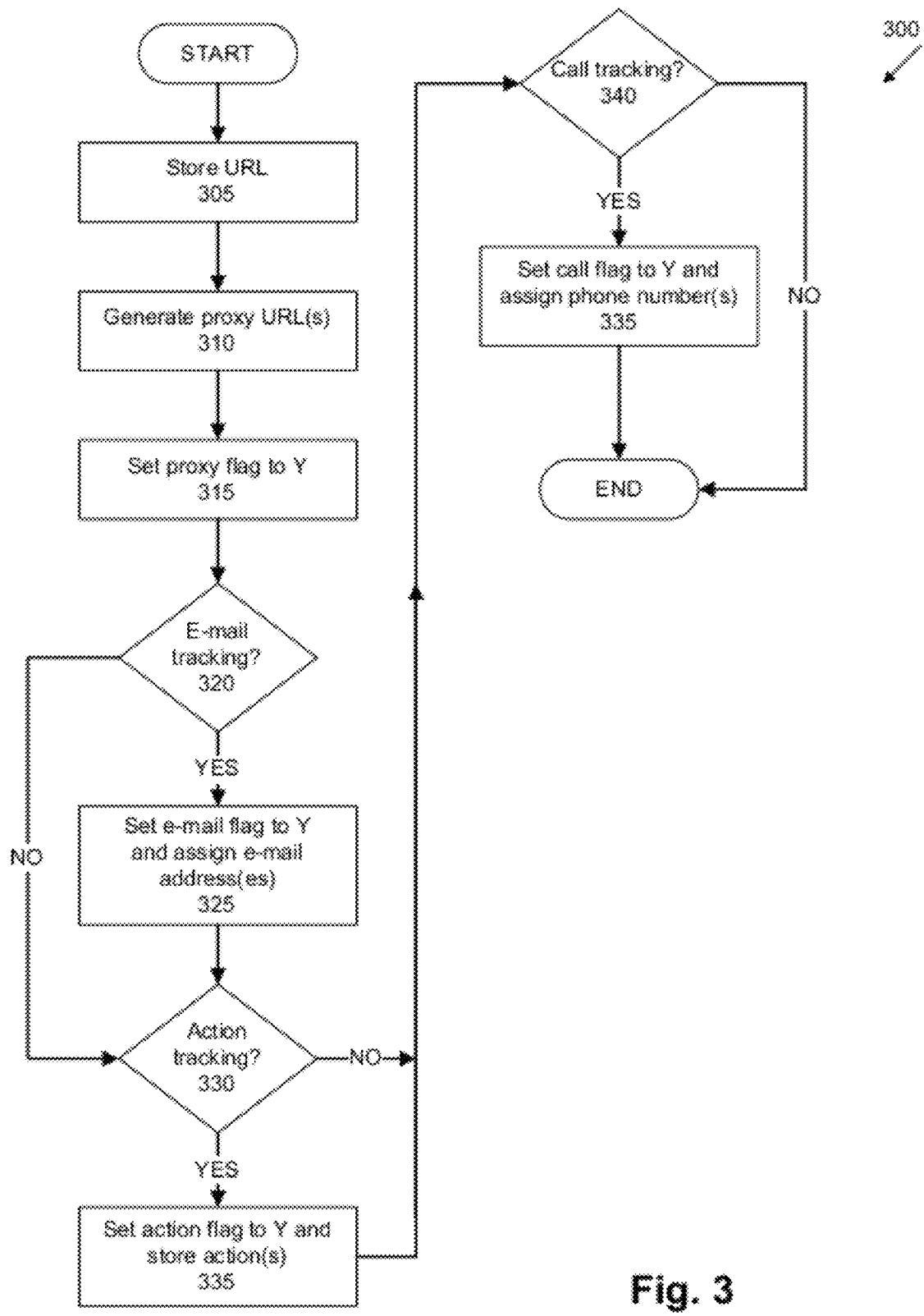
FIG. 3 illustrates an exemplary process for provisioning listings.
Figure 4:
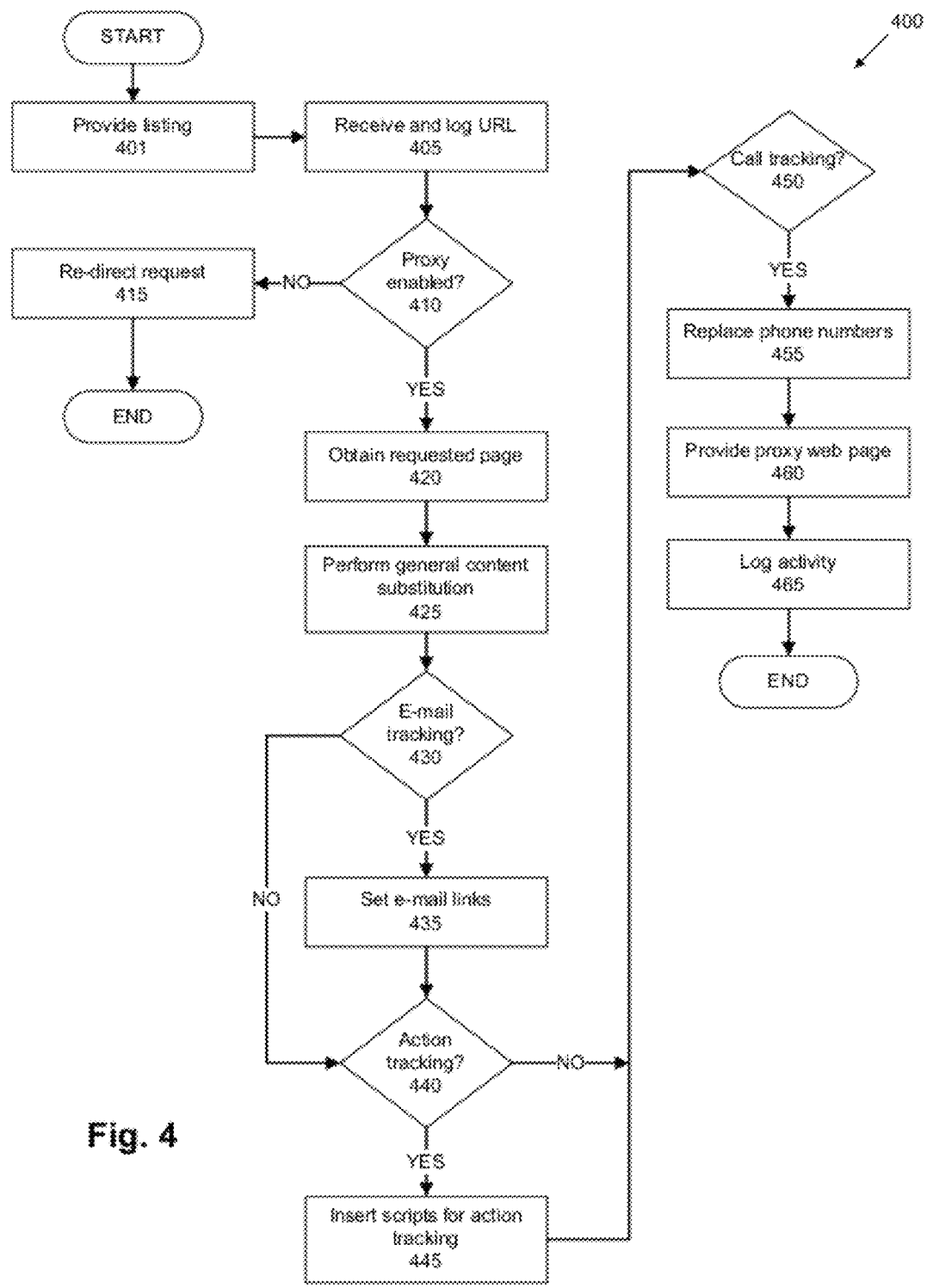
FIG. 4 illustrates an exemplary process for distributing listings.

FIGS. 3 and 4 illustrate exemplary processes for provisioning and distributing listings 140. FIG. 3 illustrates an exemplary process 300 for provisioning listings 140.

Process 300 begins in a step 305, in which an advertiser URL 155 is stored in data store 130. For example, server 120 may provide an interface through which an advertiser 150 can purchase a listing 140, and provide information relating to the listing 140 to be stored in data store 130. Alternatively or additionally, an operator of advertising platform 110 may populate data store 130 with information provided by advertiser 150 upon purchase of a listing 140.

Next, in step 310, server 120 generates one or more proxy URLs 160 to be associated with the advertiser URL 155 stored as described above with respect to step 305. Note that in an alternative process, proxy URLs 160 could be generated dynamically, e.g., at the time when proxy server 120 receives a request from a client 105 based on a client 105 selection of a link in a listing 140. Generally, advertiser URL 155 has a one-to-one relationship with a proxy URL 160. However, it is possible that URL 155 has a one-to-many relationship with URL 160, e.g., where different proxy web pages are to be provided to client 105 depending on a listing 140 having been provided in response to a query provided by different traffic partners 145.

Next, in step 315, a proxy flag 165 associated with the proxy URL 160 established in step 310 is set to "Y", meaning "yes," i.e., that a proxy URL 160 is to be used in association with the URL 155 submitted in step 305. By default, proxy flag 165 in the presently illustrated exemplary implementation is set to "N", meaning that a proxy URL 160 is not to be used in association with the URL 155 submitted in step 305. That is, although not illustrated in FIG. 3, when an advertiser 150 purchases a listing 140, a determination must be made whether the advertiser 150 has elected to use reverse proxy features available through advertising platform 110. Only if the advertiser 150 wishes to receive reverse proxy features is proxy flag 165 set to "Y".

Next, in step 320, server 120 determines whether advertiser 150 has elected to receive an e-mail tracking feature provided by advertising platform 110. If yes, step 325 is executed next. Otherwise, step 330 is executed next.

In step 325, e-mail flag 170 associated with the proxy URL 160 established in step 310 is set to "Y". By default, e-mail flag 170 is set to "N".

In step 330, server 120 determines whether advertiser 150 has elected to receive an action tracking feature provided by advertising platform 110. If yes, step 335 is executed next. Otherwise, step 340 is executed next.

In step 335, action tracking flag 175 associated with the proxy URL 160 established in step 310 is set to "Y". By default, action tracking flag 175 is set to "N".

In step 340, server 120 determines whether advertiser 150 has elected to receive a call tracking feature provided by advertising platform 110. If yes, step 345 is executed next. Otherwise, process 300 ends.

In step 345, call tracking flag 180 associated with the proxy URL 160 established in step 310 is set to "Y". By default, call tracking flag 180 is set to "N".

Following step 345, process 300 ends.

FIG. 4 illustrates an exemplary distribution process 400 for a listing 140 being provided based on a user search request submitted via a traffic source 145.

Process 400 begins in a step 401, when a listing or listings 140 are provided to client 105. For example, a traffic partner 145 may provide a search request to server 120 via network 115. Server 120 in turn submits the search request to data store 130, obtains one or more responsive listings 140, and provides the responsive listings 140 to client 105, or to the traffic source 145, which in turns provides the responsive listing or listings 140 to client 105. For example, as mentioned above, traffic source 145 may provide a web page or some other interface displaying listings 140. Alternatively, server 120 may receive search queries directly from client 105, and may then provide a listing or listings 140 in response to client 105 via network 115. Note that processing a search request, and providing listings 140 in response to a search request, may involve considering a quality score associated with the traffic source 145, as described below.

Next, at step 405, server 120 receives a request based on a selection of a link in a listing 140, e.g., a request for a proxy URL 160. Further, an advertiser URL 155 may be provided to server 120 upon receiving a selection of a link, e.g., as part of the query string thereof, or other input mechanism provided to client 105 in a listing 140. Along with the advertiser URL 155, server 120 may obtain, e.g., from data store 130, an identifier for the advertiser 150 associated with the URL 155, and also may obtain an identifier for a traffic source 145 through which the request was provided. That is, the URL 155 may have been provided in response to a listing 140 displayed by the traffic partner 145. Accordingly, information about the receipt of the URL 155, such as a time and date of the receipt, the advertiser 150 identifier, the traffic source 145 identifier, etc., may be logged by server 120 and/or stored in data store 130.

Next, at step 410, e.g., by parsing a query string including the request of step 405 for proxy flag 165, by querying data store 130 for the value of a proxy flag 165 associated with advertiser 150 or the advertiser URL 155, etc., server 120 determines whether the advertiser URL 155 obtained in step 405 is proxy-enabled. That is, server 120 determines whether a reverse proxy web page 125 is to be provided in response to the advertiser URL 155. If not, step 415 is executed next. Otherwise, step 420 is executed next.

In step 415, server 120 redirects the request for the URL 155, e.g., to advertiser 150 for display of advertiser 150 web page 185. Following step 415, process 400 ends.

In step 420, which follows step 410 if the advertiser URL 155 received in step 405 is proxy-enabled, server 120 obtains a web page associated with the requested URL 155. Such page may be stored in data store 130, may be obtained from advertiser 150, e.g., to query an advertiser 150 web server accessible via network 115, or could even be obtained from some other web server or source.

Next, in step 425, server 120 performs an initial generation of a proxy web page 125 that includes the web page obtained in step 420. Server 120 then substitutes into the proxy web page 125 predetermined content, other content that may be used for tracking purposes, such as is described with respect to steps 430-455 below. For example, server 120 may include instructions for replacing images, text such as headline or banner text, or other components of the web page.

Next, in step 430, server 120, generally by querying data store 130 for the value of e-mail flag 170 associated with advertiser 150 or advertiser URL 155, determines whether the advertiser URL 155 received in step 405 is to be associated with any e-mail tracking If so, step 435 is executed next. Otherwise, step 440 is executed next.

In step 435, server 120 continues the generation of proxy page 125 by substituting e-mail links, e.g., hypertext markup language (HTML) "mailto" links or the like, in the web page obtained in step 420 with e-mail links provided from data store 135. Such e-mail links may be stored in data store 130 as part of process 300 described above, e.g., in association with advertiser 150 and/or advertiser URL 155.

Next, in step 440, server 120, generally by querying data store 130 for the value of action tracking flag 175 associated with advertiser 150 or advertiser URL 155, determines whether the advertiser URL 155 received in step 405 is to be associated with any action tracking If so, step 445 is executed next. Otherwise, step 450 is executed next.

In step 445, server 120 insert scripts or the like, e.g., Java scripts or the like, that may be used to track inputs or other actions by client 105. For example, a script may track a client 105 selection of a HTML "submit" button, a client 105 submission of information through an HTML input form, etc. Such a script may operate by causing information to be sent to server 120, which stores such information in data store 130 or otherwise logs it. Such scripts may be stored in data store 130 as part of process 300 described above, e.g., in association with advertiser 150 and/or advertiser URL 155.

In step 450, server 120, generally by querying data store 130 for the value of call tracking flag 180 associated with advertiser 150 or advertiser URL 155, determines whether the advertiser URL 155 received in step 405 is to be associated with any call tracking If so, step 455 is executed next. Otherwise, step 460 is executed next.

In step 455, server 120 continues the generation of proxy page 125 by substituting a telephone number or numbers in the web page obtained in step 420 with a telephone number or numbers provided from data store 135. Such telephone numbers may be stored in data store 130 as part of process 300 described above, e.g., in association with advertiser 150 and/or advertiser URL 155.

In step 460, server 120 provides proxy web page 125 to client 105, e.g. via network 115.

Next, in step 465, server 120 logs activity with respect to proxy web page 125. For example, client 105 selection of tracking e-mail addresses, tracking telephone numbers, or tracked actions, may all be logged. For example, a tracking e-mail address may cause an e-mail to be sent to a server in platform 110, which provides information concerning the e-mail to server 120, or logs information in data store 130, before forwarding the e-mail to advertiser 150. Logged e-mail information may include an address of the sender, a time and date the e-mail was sent, an identifier for the advertiser 150 to whom the e-mail was sent, etc. Further, use of a tracking telephone number may cause a telecommunications provider to provide information to platform 110 concerning use of the tracking telephone number, such as the number, a date and time when the number was called, etc. The number and associated information may then be stored in data store 130, a log file, etc. In addition, information concerning track actions may similarly be stored in data store 130, a log file, etc., including information concerning the action that was tracked, e.g., an identifier for a tracked action such as clicking a "submit" button, providing input via an HTML form, etc.

All of the foregoing information logged in data store 130 or elsewhere may include an identifier for a traffic source 145 for the URL 155 request received in step 405, and generally includes an identifier for the advertiser 150, and possibly an identifier for a particular listing 140 in response to which a URL 155 was submitted to server 120 as described above with respect to step 405. In general, reverse proxy web page 125 allows a provider of advertising platform 110 to obtain detailed information concerning actions of a user 105. As described below, performance metrics may use information to allow advertising platform 110 to maximize revenue and/or to efficiently determine prices for display of listings 140 and/or for inclusion of listings 140 in a set of search results. Performance metrics may also be used in other ways, e.g., to evaluate traffic sources 145.

Following step 465, process 400 ends.

Performance Metrics

As used herein, a "conversion" is a selection of a URL 155, hyperlink, or some other input mechanism, in a listing 140. Accordingly, a "conversion ratio" of a listing 140 is a ratio of conversions to the cost, i.e. total amount of money spent by advertiser 150, of the listing 140. A conversion ratio can be computed for multiple listings 140 of an advertiser 150, or even for groups of advertisers 150. Further, a conversion ratio can be computed for one or more traffic sources 145, e.g., conversion ratios for a listing 140 can be compared for respective traffic sources 145. The conversion ratio is calculated using data that is stored in data store 130, e.g., data logged as described above with respect to process 400. The conversion ratio may be used to determine a fair pricing metric as described below. The conversion ratio may also be used to perform optimized distribution with fair pricing, i.e., an optimized distribution that guarantees a quality threshold and operational optimization of system sources in demand, a quality threshold and such optimized distribution also being described below.

The conversion ratio (CR) of an advertiser 150 with respect to a particular traffic source 145 is provided by equation (1) below where, $A_{a,p_i}$ is the number of actions in a proxy web page 125, for each action type i from 1 to n, associated with a particular advertiser 150 and a particular traffic source 145, the advertiser 150 being denoted by "a" and the traffic source 145 being denoted by "p." Exemplary action types include selecting a "submit" button in the web page 125, providing input in an HTML form, viewing web page 125 for a certain amount of time, receiving an e-mail by selecting a "mailto" link or the like in the web page 125, etc. An "action count" $A_{a,p_i}$ for a particular advertiser 150, traffic source 145, and particular type of action, may be stored in data store 130, and may include one or more of the following: the number of times a particular action has been recorded as occurring with respect to the proxy web page 125, e.g., the number of times the page 125 was viewed, the number of times a phone number was called, the number of times an e-mail address was used, the number of times a form submission occurred, etc.

Further, a web page 125 may have multiple "submit" buttons, multiple forms, etc., giving rise to multiple action types. Additionally in equation (1), $V_{a_i}$ is an expected monetary value of an action of type i to advertiser 150, and $Cost_{a,p}$ is the cost to the advertiser 150 having listings 140 displayed by the particular traffic source 145. Values $V_{a_i}$ may be stored in data store 130 in "conversion tables" that server 120 then populates to identify an expected, generally monetary, value ($V_{a_i}$) for each action the advertiser 150 has chosen to track in a proxy web page 125. For example, a value $V_{a_i}$ is established for each occurrence of a call, email, form submission, page view, shopping cart submission, etc. A conversion table may be populated at the time an advertiser 150 or administrator of platform 110 performs the provisioning process 300 described above, for example.

Accordingly:

$$CR_{a,p} = \frac{\sum_{i=1}^{\# \text{ of types of actions}} A_{a,p_i} \cdot V_{a_i}}{Cost_{a,p}} \qquad \text{Equation (1)}$$

$Cost_{a,p}$ may be calculated according to Equation (2) below where $N_{a,p}$ is the number of actions associated with a particular traffic source 145 for a particular advertiser 150, and $Amt_a$ is the amount that the advertiser 150 is charged for each action, e.g., a click on a hyperlink, form submission, etc.

$$Cost_{a,p} = N_{a,p} \cdot Amt_a$$

A conversion ratio from Equation (1) can then be used to calculate a metric for fair pricing ($FP_{a,p}$) for an advertiser 150, denoted "a" whose listings are provided to clients 105 accessing platform 110 through a traffic source 145, denoted "p," as expressed by Equation (3) below. The constant 1 is a parameter that may be adjusted to any higher or lower numeric value. For example, a provider of advertising platform 110 may agree to provide at least 110% return on investment for an advertiser 150, in which case the constant might be set to 1.1

$$FP_{a,p} = \begin{cases} CR_{a,p} \cdot Amt_a & , CR_{a,p} < 1 \\ Amt_a & , CR_{a,p} \geq 1 \end{cases} \quad \text{Equation (3)}$$

Or, $$FP_{a,p} = \min(1, CR_{a,p}) \cdot Amt_a$$

As can be seen from understanding equation (3), the purpose of the fair pricing concept is to allow advertisers the benefit of a better price when a conversion ratio is low, e.g., less than 1, but to not charge advertisers 150 a higher price than the quoted amount per action, when a conversion ratio is high, e.g., greater than or equal to 1.

The fair pricing concept described above can be implemented for any network 115 traffic where the charged amount $Amt_a$ for each action can be determined and modified. However, sometimes a third party, e.g., a traffic source 145, and not advertising platform 110, establishes the charged amount $Amt_a$. Thus, in these instances, from the perspective of platform 110, the charged amount $Amt_a$ is fixed, and the fair pricing concept, which depends on an ability to adjust the amount an advertiser is actually charged for a click or other action, cannot be implemented.

Therefore, where the charged amount $Amt_a$ is established by a third party, an optimized distribution approach may be implemented without using fair pricing, e.g., as described by Equation (3), where the distribution of a listing 140 in response to queries from various traffic sources 145 is optimized so that the net revenue to platform 110 is maximized, and also so that the utilization of the available budget established by an advertiser 150 is maximized while maintaining relatively high conversion rates for the advertiser 150.

An optimized distribution approach that uses fair pricing, e.g., as described by Equation (3), depends on ranking each traffic source 145 for advertisements 155 associated with an advertiser 150. In equation (4) below, $T_{p,t}$ is the expected/estimated traffic, i.e., a number of requests in response to which are provided listings 140 of an advertiser 150, from a particular traffic source 145 for a time period t, $CTR_{p,t}$, sometimes called click-through-ratio, is a ratio of a number of actions from proxy web pages 125 associated with a traffic source 145 to a number of times web pages 125 associated with the traffic source 145 have been provided during the time period t, and $FP_{a,p}$ is the fair price that the advertiser 150 is charged based on the expected conversion ratio for the traffic provided by traffic source 145, calculated according to equation (3) above. Accordingly, equation (4) provides a ranking $\delta_{a,p,t}$ as follows:

$$\delta_{a,p,t} = T_{p,t} \cdot CTR_p \cdot FP_{a,p} \quad \text{Equation (4)}$$

If traffic or click through ratios cannot be determined for calculation of equation (4) because data store 130 has not yet accumulated enough historical data to provide a meaningful estimate, then an average or aggregation of data from other traffic sources 145 can be used to establish a baseline value or values, as needed, especially if such data from other traffic sources 145 relates to a same or similar advertisers 150. The result from equation (4) can be used to determine or identify a set of traffic sources 145 to whom listings 140 of particular advertisers 150 should be distributed, as explained in the following paragraphs.

First, a total expendable budget ($Budget_{a,t}$) for a given time period t for an advertiser 150, denoted "a", may be determined, e.g., the advertiser 150 may provide such budget and the budget may be stored in data store 130. An optimal distribution of listings 140 of the advertiser 150 may be determined in part by calculating the amount of a budget that has been spent according to the following equations, where $BudgetSpent_{a,t}$ equals the total spent by the advertiser 150 in time period t and the $BudgetUnSpent_{a,t} = Budget_{a,t} - BudgetSpent_{a,t}$. Note that, in the following equations, the variable T represents actual or recorded traffic from a traffic source 145, in contrast to Equation (4) above, in which T represents an expected amount of traffic from a traffic source 145. Accordingly for n traffic sources 145:

$$BudgetSpent_{a,t} = \sum_{i=1}^{n} T_{p_i,t} \cdot CTR_{p_i} \cdot FP_{a,p_i} \quad \text{Equation (5)}$$

Further, refining equation (5), revenue for a particular advertiser 150, denoted "a," over a time period t is expressed by Equation (6), where $M_p$ is the profit margin with a particular traffic source 145.

$$Rev_{a,t} = \sum_{i=1}^{n} T_{p_i,t} \cdot CTR_{p_i} \cdot FP_{a,p_i} \cdot M_{p_i} \quad \text{Equation (6)}$$

The purpose of Equations (5) and (6) is to maximize revenue (Re $v_{a,t}$) and to minimize the unspent budget ($BudgetUnSpent_{a,t}$), while providing a sufficiently high conversion ratio ($CR_{a,p}$) for the advertiser 150 (denoted by "a") for listings 140 provided via traffic partner 145 (denoted by "p"). This purpose can be achieved by sorting all traffic sources 145 in descending order of the value of the rankings ($\delta_{a,p,t}$), and choosing the top x traffic partners 40 to obtain the lowest possible positive value of $BudgetUnSpent_{a,t}$, i.e., to maximize $BudgetSpent_{a,t}$ and minimize $BudgetUnSpent_{a,t}$.

Alternatively, an optimized distribution scheme can be determined without a fair costing computation. In this approach, a cumulative quality score ($QS_p$) is computed for each traffic source 145. The cumulative quality score is the conversion ratio ($CR_{a,p}$) associated with listings 140 returned to the traffic source 145, divided by the number of actions associated with those listings 140. The cumulative quality score is sometimes referred to as the "total quality score" for a traffic source 145. This cumulative quality score is normalized to a standard scale, and in one exemplary approach, can be used to guarantee to an advertiser 150 that its cumulative quality score ($QS_p$) will be maintained above a certain predefined threshold for all traffic received by the advertiser 150 from platform 110.

The quality score of a traffic source 145, $QS_p$, is the average of the conversion ratios ($CR_{a,p}$) for each listing 140 displayed by the traffic source 145 in a period of time for which the quality score is computed, divided by the total number of actions recorded that are associated with the traffic source 145. Further, a quality score may be computed for a combination of the traffic source 145 and an advertiser 150, i.e., each traffic source 145 may be associated with a plurality of quality scores, each of the plurality of quality scores also associated with a particular advertiser 150. In one exemplary approach, the quality score ($QS_p$) is normalized to a scale having values between 1 and N (e.g., N=10) for each traffic source 145. Like optimized distribution with fair costing, described above, revenue and ranking computations are performed in implementations using a quality score. Specifically, revenue and ranking calculations are performed as follows.

A revenue score for a traffic source 145 ($RS_p$) represents potential for the source 145 to generate revenue for platform 110. The revenue score is calculated according to Equation (7) below, where $M_y$ is a profit margin for the traffic source 145, and $C_p$ is an average cost per action, e.g., click, for that traffic source 145 for all listings 140.

$$RS_p = C_p \cdot (1 + M_p) \quad \text{Equation (7)}$$

Further, a ranking parameter ($\gamma_{p,t}$) may be calculated for a traffic source 145 for a time period t, as seen in Equation (8). An adjustment factor $\gamma_t$ may be used to maintain a balance between the revenue and the quality. Adjustment factor $\gamma_t$ is a variable used to adjust the overall quality score and to maintain a particular quality score guarantee at a time t. Generally, an initial value, $\gamma_1$, is set to 1, to compute an initial value of $\gamma_{p,t}$. $\gamma_t$ may then be adjusted as time progresses in subsequent computations of Equation (8) as it becomes desirable to give more or less relative weight to the quality score and the revenue score in computing $\gamma_{p,t}$.

$$\gamma_{p,t} = QS_p + \lambda_t \cdot RS_p \quad \text{Equation (8)}$$

The total revenue generated (Re $v_t$) generated in the time period t by n traffic sources 145 is represented by Equation (9) below.

$$Rev_t = \sum_{i=1}^{n} T_{i,t} \cdot CTR_i \cdot RS_i \quad \text{Equation (9)}$$

A choice of a traffic sources 145 may be made based on a ranking of traffic sources 145 according to the parameter $\gamma_{p,t}$. As noted above, $\gamma_{p,t}$ may be adjusted over time. An average quality score for a particular listing 140 for all traffic sources 145 is, at the end of time period t, $QS_{avg,t}$, given by Equation (10). In Equation (10), $N_i$ is the number of actions, e.g., clicks, resulting from a traffic source 145. Then, remaining traffic to listings 140 of an advertiser 150 during a next time period T-t may be adjusted so that the average quality score is maintained at $QS_{avg,T}$ at the end of the time period T-t. To do this, the value of $\lambda_{t+1}$ is adjusted so that values of $\gamma_{p,t}$ for traffic sources 145 will be adjusted to provide traffic sources 145 with higher or lower values of $QS_p$ to make $QS_{avg,T}$ equal, or at least close in value to, an average quality score desired by or promised to an advertiser 150.

$$QS_{avg,t} = \frac{\sum_{i=1}^{\# \text{ of partners}} N_i \cdot QS_i}{\sum_{i=1}^{\# \text{ of partners}} N_i} \quad \text{Equation (10)}$$

As discussed in more detail below concerning FIG. 5, when the search traffic is more than can be handled by particular computing infrastructure, there is competition for system resources such as computing cycles, network bandwidth, memory, etc. During such situations, the resource allocation can be accomplished by sorting all the traffic partners in the descending order of their quality score ($QS_p$) and choosing the top n partners that the system resources can handle.

Figure 5:
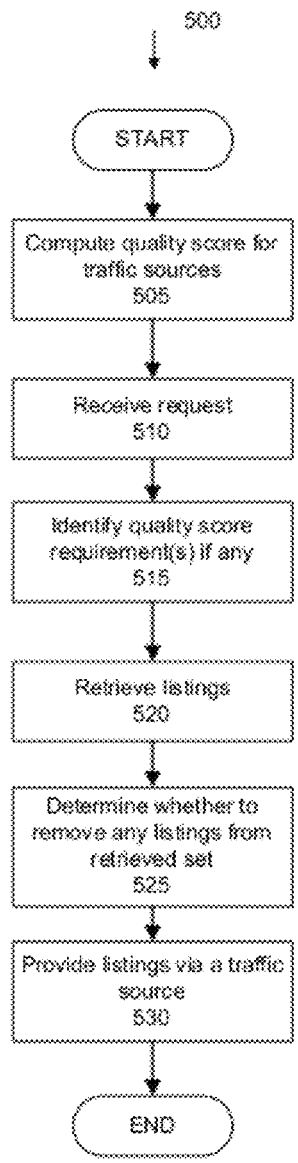
FIG. 5 illustrates an exemplary process for using a quality score of a traffic source to identify listings to be returned in a request submitted via the traffic source.

FIG. 5 illustrates an exemplary process 500 for using a quality score of a traffic source 145, or an allocated budget, to identify listings 140 to be returned in a request submitted via the traffic source 145.

Process 500 begins in step 505, in which advertising platform 110, e.g., in a routine or module included in data store 130, calculates a quality score. For example, the quality score may be an average quality score, e.g., as calculated above in Equation (10), for a set of traffic sources 145, possibly but not necessarily all traffic sources 145 for the platform 110. Alternatively, in step 505, the quality score may be a traffic source quality score (TQS) for a traffic source 145 or a traffic partner set 190, as described in detail below with respect to FIGS. 6C-6D. TQS provides an indication of past performance and expected future performance of the traffic sources 145 or partner sets 190 at least in part with respect to capability for revenue generation. Further, platform 110 may calculate a quality score in ways other than as described with respect to average quality score and traffic source quality score.

Next, in step 510, advertising platform 110, e.g., proxy server 120, receives a request from a traffic source 145, e.g., a search request for a set of listings 140.

Next, in step 515, advertising platform 110, e.g., according to instructions stored on proxy server 120, determines whether to consider, before responding to the request of step 510, a quality score associated with a traffic source 145 making the request. Proxy server 120 may be programmed to give such consideration under a variety of circumstances. For example, advertising platform 110, e.g., proxy server 120, could be receiving a large volume of requests such that proxy server 120 cannot handle all the requests, or is in danger of not being able to handle all the requests. Accordingly, upon detecting a volume of requests in a period of time at or above a predetermined threshold number of requests, proxy server 120 may be configured to respond only to requests from traffic sources 145 with an average quality score above a predetermined threshold quality score. The predetermined threshold quality score could be established according to an empirical analysis of average quality scores associated with the set of traffic sources 145 for which quality scores were calculated as described above with respect to step 505. For example, advertising platform 110 could determine that, in times when traffic to proxy server 120 is heavy, only traffic from traffic sources 145 having quality scores in the top 25% of quality scores will be handled.

Following step 515, next, in step 520, proxy server 120 acts on the request received from a traffic source 145 as described above with respect to step 510. If no requirement to consider a quality score associated with the traffic source 145 making the request is identified in step 515, then proxy server 120 simply proceeds to provide one or more listings 140 as described above with respect to step 401 in process 400. On the other hand, in some cases, a request from a traffic source 145 may simply be ignored, e.g., where proxy server 120 has determined that traffic is heavy, e.g., rises above a certain threshold, and the request is from a traffic source 145 whose average quality score falls below a predetermined threshold. However, if the request is associated with a traffic source 145 having an average quality score falling at or above the predetermined threshold promise to the advertiser 150, or falling above the predetermined threshold required when traffic to proxy server 120 is heavy, then the request may be processed in a manner such as described above with respect to step 401 of process 400.

Next, in step 525, proxy server 120 determines whether any of the listings 140 retrieved in step 520 should be removed from the set of listings 140 before the set of listings 140 is returned for display via a traffic source 145. Note that this step is optional; such determination may be omitted, and listings 140 may be returned for display via the traffic source 145 without removal of any of the listings 140, or without consideration of whether any listings should be removed from the set of listings 140. Step 525 is generally executed when platform 110 has promised one or more advertisers 150 that listings 140 associated with the advertiser 150 will be provided in response to requests through a traffic source 145 only if the traffic source 145 has an average quality score at or above a predetermined threshold.

Assuming that step 525 is executed, and that proxy server 120 does make a determination whether to remove listings 140 from a set of listings 140, proxy server 120 considers whether a quality score associated with a traffic source 145 making the request meets the predetermined threshold quality score promised to each of the advertisers 150 associated with listings 140 included in the set of listings 140 retrieved in response to the search request. Further, it is possible that one or more advertisers 150 associated with listings 140 in the set of listings 140 may not have been promised a predetermined threshold quality score, in which case such listings 140 will be included in listings 140 returned via the traffic source 145 by default. In some cases, as is discussed in more detail below with respect to FIG. 6, a quality score of a traffic source 145 further pertains to a specific advertiser 150, i.e., a set of quality scores may be computed for a traffic source 145, each of the quality scores pertaining to a different advertiser 150. Further, as is also discussed in more detail below with respect to FIG. 6, traffic sources 145 may be ranked according to their quality scores, and such rankings may be adjusted as quality scores change over time.

Step 525 may alternatively or additionally include limiting delivery of listings 140 through one or more traffic sources 145 based on advertiser 150 budget allocations, e.g., determined using budget allocator 195, as discussed below in detail with reference to FIGS. 7-11. Such a limitation is appropriate when listings 140 associated with the advertiser 150 are to be provided in response to requests through a traffic source 145 only if there is budget remaining A remaining budget may be associated with, e.g., one or more listings 140, the delivery of listings 140 through the traffic source 145, or the delivery of listings 140 through the partner set 190 that includes the traffic source 145. Advertiser 150 may specify a monetary budget for the delivery of listings 140 by platform 110. Advertiser 150 may specify a single budget to use for all listings 140 delivered through any traffic source 145. Alternatively, advertiser 150 may specify multiple budgets, each of which applies to delivery of listings 140 through a traffic source 145 or partner set 190. A specified budget is a budget for a certain period of time, e.g., one month. Platform 110, generally via budget allocator 195, determines how to allocate a specified budget for a period to sub-periods within the period, e.g., to a day or days in a period of one month. The budget for the sub-period may be used to limit the number of listings 140 delivered for that advertiser 150 in the sub-period, or to limit delivery of listings 140 through a traffic source 145 or partner set 190 in that sub-period.

Next, in step 530, one or more listings 140 are returned to the traffic source 145 in response to the request received as described above with respect to step 510.

Following step 530, process 500 ends.

Figure 6A:
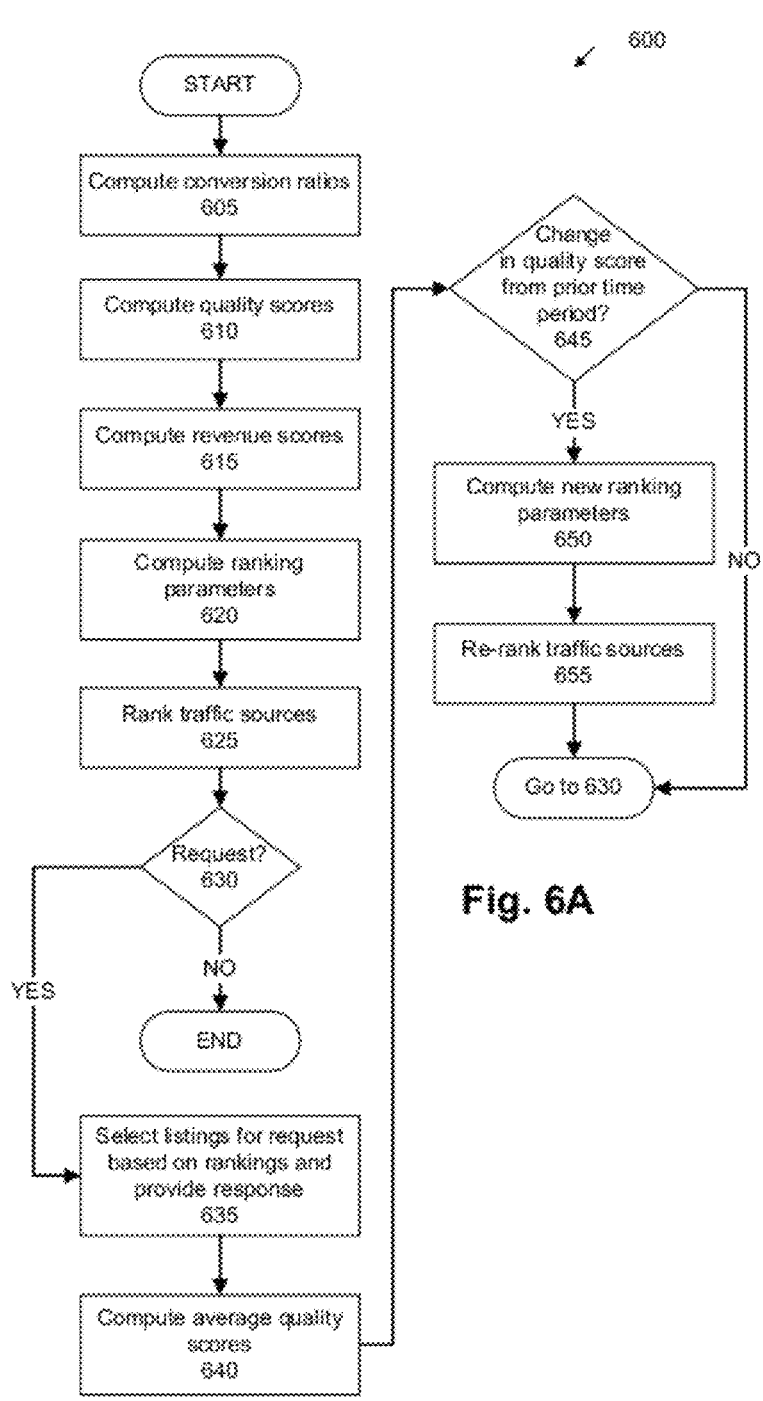
FIG. 6A illustrates an exemplary process for adjusting rankings of traffic sources.

FIG. 6A illustrates an exemplary process 600 for adjusting rankings of traffic sources 145.

Process 600 begins in a step 605, in which proxy server 120, data store 130, or some other device included in platform 110 carrying out instructions stored on a computer readable medium, computes a conversion ratio for each traffic source 145 in a group of traffic sources 145 for each advertiser 150 in a group of advertisers 150. Such computation may be done in a manner described by Equation (1) above, e.g., using tracking records 135 relating to each traffic source 145 and each listing 140 associated with the advertiser 150. That is, step 605 results in a set of one or more conversion ratios, each applicable to a combination of a traffic source 145 and an advertiser 150. The group of traffic sources 145 may include all traffic sources 145 for which information is stored in data store 130, or may be some subset of traffic sources 145. Similarly, the set of advertisers 150 may include all advertisers 150 for whom information is stored in data store 130, or may be some subset of advertisers 150.

Next, in step 610, platform 110, i.e., some device therein carrying out computer executable instructions, computes quality scores for each of the traffic source 145/advertiser 150 combinations for which conversion ratios were computed in step 605. As mentioned above, a quality score for a traffic source 145 is the conversion ratio associated with all or substantially all listings 140 returned to the traffic source 145, divided by the number of actions associated with those listings 140.

Next, in step 615, platform 110, i.e., some device therein carrying out computer executable instructions, computes revenue scores, e.g., as described in Equation (7) above, for each of the traffic source 145/advertiser 150 combinations for which quality scores were computed in step 610.

Next, in step 620, platform 110 computes ranking parameters for each of the traffic sources 145 for each of the advertisers 150 identified in step 605, e.g., for a particular time t as described in Equation (8) above.

Next, in step 625, platform 110, for each advertiser 150 identified in step 605, ranks the traffic sources 145 according to the ranking parameters computed in step 620. Although not illustrated in FIG. 6, process 600 could end after step 625. For example, the computations performed as described in steps 605-625 could be stored and later used by a process in platform 110. However, as presently illustrated, process 600 proceeds to step 630 following step 625.

Process 660, discussed below with reference to FIG. 6B, may be used in lieu of steps 605-625 of process 600. Also, process 660 may be executed independently of process 600.

In step 630, proxy server 120 determines whether a request for listings 140 has been received from a traffic source 145. If not, proxy server 120 may wait for such a request, e.g., for a predetermined amount of time, or, as illustrated in FIG. 6A, process 600 may end. If proxy server 120 has received a request for listings 140, then step 635 is executed next.

In step 635, proxy server 120 retrieves listings 140 from data store 130, and provides selected listings 140 in response to the request received in step 630. Such listings 140 are generally selected according to the ranking of traffic sources 145 performed as described above in step 625. That is, an advertiser 150 purchasing a listing 140 may have been provided a commitment from advertising platform 110 that the listing 140 will only be provided in response to requests submitted through traffic sources 145 having a quality score at or above a certain threshold, or that are ranked at or above a predetermined threshold, e.g., top five, top 25%, etc. in a ranking of traffic sources 145 for the advertiser 150 associated with the listing 140. In the presently illustrated embodiment, listings 140 may be guaranteed to be provided only to traffic sources 145 ranked above a predetermined threshold, e.g., top five, for the advertiser 150 associated with the listing 140. Accordingly, proxy server 120 determines, for each listing 140 retrieved from data store 130, the ranking for the relevant advertiser 150, if any, that must be associated with a traffic source 145, in order for the listing 140 to be returned in response to a request received through that traffic source 145. Only listings 140 whose ranking requirements are met or exceeded by the rank of the traffic source 145 for the relevant advertiser 150, or which have no ranking requirements, are selected for inclusion in the response to the request received in step 630.

Process 600 may end following step 635, or may return to step 630. However, in the presently illustrated embodiment, step 640 is executed following step 635. In step 640, platform 110, i.e., some device therein carrying out computer executable instructions, computes average quality scores for each listing 140 in a set of listings 140. As mentioned above, quality scores may be computed for various attributes, e.g., for a traffic source 145. Quality scores may also be computed for one or more advertisers 150, one or more listings 140, etc. Here, an average quality score is computed for each listing in a set of listings 140. The set of listings 140 may be all listings 140 stored in data store 130, only the set of listings 140 provided in a response to a request as described above in step 635, or some other subset of listings 140. An average quality score for a listing 140 may be computed as described above with respect to Equation (10). The average quality score of step 640 for a listing 140 is generally computed for a given period of time, e.g., a period of hours, days, etc. Then, as described below, the average quality score for a listing 140 for the given period of time may be advantageously compared to an average quality score for the listing 140 for a second given period of time. Further, average quality scores for each listing 140 are generally stored in data store 130, generally associated with a given time period.

Next, in step 645, platform 110, i.e., some device therein carrying out computer executable instructions, determines, for each of the listings for which an average quality score was computed in step 640, whether that quality score differs from an average quality score computed for the listing for a different time period, e.g., by retrieving quality scores for and immediately previous time period from data store 130. If an average quality score for any listing 140 has changed from a first period of time to a second period of time, then step 650 is executed next. Otherwise, step 630 is executed next.

In step 650, platform 110 computes new ranking parameters for each of the traffic sources 145 according to each advertiser 150, e.g., in a manner that ranking parameters, and the prerequisites to ranking parameters, are computed as described above with respect to steps 605-625. However, as noted above, when Equation (8) is initially used, and adjustment factor $\lambda$ is generally effectively omitted, i.e., set to 1, in subsequent iterations, adjustment factors $\lambda_{t+1}$, etc., are generally designed to give more or less weight to a quality score associated with a traffic source 145 for an advertiser 150, so that advertising platform 110 may meet its overall commitment to the advertiser 150 with respect to an average quality score. That is, if the average quality score for the advertiser 150 needs to be raised, then $\lambda_{t+1}$ may be set to a value lower than $\lambda_t$ in Equation (8). In other words, if $\lambda$ is set to a lower value for a particular traffic source 145 having a relatively high quality score, but a relatively low revenue score, then that traffic source 145 may be assigned, via Equation (8), a larger ranking parameter than other traffic sources 145 having relatively higher revenue scores, but relatively lower quality scores, where the adjustment factor $\lambda$ is unchanged for those other traffic sources 145, or even where $\lambda_{t+1}$ is set to a value lower than $\lambda_t$ for those other traffic sources 145.

Next, in step 655, platform 110, i.e., some device therein carrying out computer executable instructions, performs a re-ranking of traffic sources 145 for each advertiser 150, e.g., in a manner similar to the ranking of traffic sources 145 performed as described above with respect to step 625.

Following step 655, process 600 returns to step 630.

Figure 6B:
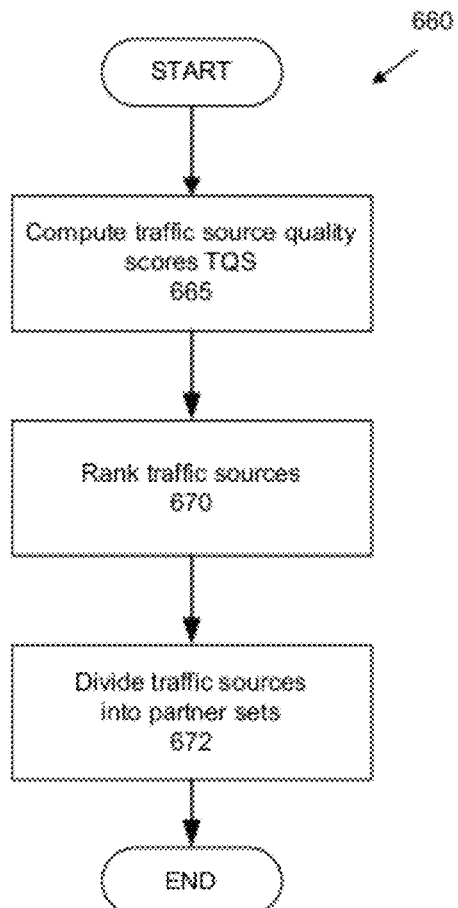
FIG. 6B illustrates an exemplary process for dividing traffic sources into traffic partner sets.

FIG. 6B illustrates a process 660 for grouping traffic sources 145 into traffic partner sets 190. As mentioned above, process 660 may be used in process 600 in lieu of steps 605-625 for determining traffic source rankings. Alternatively, process 660 for identifying partner sets 190 may be executed independently of process 600.

In steps 665-672, described in more detail below, platform 110 computes a traffic source quality score (TQS) for each traffic source 145, and then divides the traffic sources 145 into partner sets 190 based at least partly on the TQS. Platform 110 may compute TQS for traffic sources 145 in relation to a specific advertiser 150, or may compute TQS for traffic sources 145 independently of a specific advertiser 150.

In step 665, platform 110 calculates TQS for a predetermined set of traffic sources 145. Calculation of TQS is described below in detail with respect to FIGS. 6C-6D. Platform 110 may calculate TQS for one or more traffic sources 145, and/or may calculate TQS over one or more groups of traffic sources 145, including one or more partner sets 190. Subsequent steps of process 660 and its subprocesses will refer to calculating or using TQS for traffic sources 145, however, such references also apply to groups of traffic sources 145 and partner sets 190.

In step 670, platform 110 calculates a rank for each of the traffic sources 145 for which TQS was calculated in step 660, based at least in part on the TQS. The rank may be based on ascending or descending order of TQS, or based on a plurality of weighted factors, one of which is TQS. Further, platform 110 may rank traffic sources 145 in ascending or descending TQS order, and then alter the ranking based on another factor or factors. Other factors may include, e.g., a preferred provider status paid for by the traffic source 145 to effect a boost in rank, or a disfavored status resulting from unpaid fees that thereby effects a drop in rank for a traffic source 145.

In step 672, platform 110 divides the traffic sources 145 into partner sets 190 based at least in part on the ranking established in step 670. The division may be based on a statistical analysis of the ranking For example, the traffic sources 145 may be divided into sets according to percentiles, e.g., top twenty percent, next twenty percent, and so forth, resulting in five sets of traffic sources 145, each containing twenty percent of the traffic sources 145. In another example, the traffic sources 145 may be divided into sets based on deviation from the average of the TQS values, e.g., one set consisting of traffic sources 145 falling within one standard deviation of average, the next set consisting of traffic sources 145 falling between one and two standard deviations from average, etc.

Division of traffic sources 145 into partner sets 190 may include other considerations beyond traffic source 145 rankings For example, an advertiser 150 may request that certain traffic sources 145 be placed in a partner set 190 as the only member of the set 190, or that division of the traffic sources 145 into partner sets 190 take into account an advertiser 150 quality score assigned to certain traffic sources 145, etc. As a further example, platform 110 may divide traffic sources 145 into partner sets 190 based on multiple weighted factors including rankings Examples of other factors include a preferred status of a traffic source 145 based on a premium paid by a traffic source 145, or a non-preferred status of a traffic source 145 based on market or marketing considerations. In another example, after dividing the traffic sources 145 into partner sets 190, platform 110 may adjust the partner sets 190 to achieve sets with equal or similar numbers of traffic sources 145.

The division of traffic sources 145 into partner sets 190 is discussed herein as related to specific advertisers 150. However traffic sources 145 may also be grouped into partner sets 190 independent of specific advertisers 150, e.g., groupings may be made for all or a subset of all advertisers whose listings 140 are included in platform 110. Furthermore, a traffic partner 145 may desire to move up in rank in order to be placed in a different partner set 190. The traffic partner 145 may be given the opportunity to pay a fee for improved rank Following step 672, platform 110 may store the traffic source quality score (TQS), the ranking, and the partner sets 190 for use by other processes or for use at a later time. For example, TQS and partner sets 190 may be used as described above with reference to the process for determining listings 140 to deliver, or as described below with respect to the budget allocation process (see discussion of FIGS. 7-11). TQS, ranking and partner set 190 information may be used for establishing a fee structure for advertisers 150, or for negotiating with advertisers 150. For example, advertisers 150 may pay a higher fee to have their listings 140 delivered only through certain partner sets 190. Conversely, an advertiser 150 may select to use certain partner sets 190 associated with lower fees for delivery of listings 140, thereby spreading the advertiser 150 budget across more traffic sources 145.

Figure 6C:
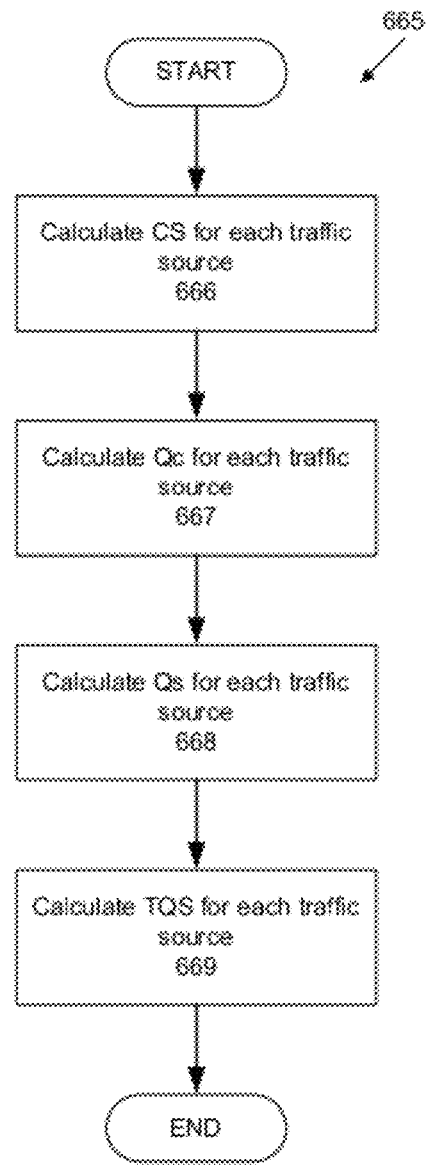
FIG. 6C illustrates an exemplary process for calculating a traffic source quality score.

FIG. 6C illustrates an exemplary process for computing a traffic source quality score TQS, e.g., as is done in step 665 of process 660 discussed above. The following discussion uses TQS as relating to one traffic source 145 for ease of discussion, however, as discussed above, TQS may alternatively relate to a group of traffic sources 145, or a partner set 190, e.g., stored as described above with respect to step 672 of process 660

In step 666, platform 110 calculates a conversion score CS for each traffic source 145. A possible implementation of step 666 is described in detail below with respect to FIG. 6D.

In step 667, platform 110 calculates a quality of user clicks Qc based on a number of user 105 billable clicks BC obtained from tracking records 135 in data store 130 along with the conversion score CS determined in step 666. A billable click BC is a user 105 selection of an advertisement hyperlink on a web page 125 delivered by the reverse proxy server 120. Qc is calculated according to equation (11).

$$Qc = CS/BC \quad \text{Equation (11)}$$

In step 668, platform 110 calculates a quality of search queries Qs based on the number of user 105 billable clicks BC and a number of enabled user 105 search requests Er. An enabled user 105 search request is a user 105 search request that platform 110 can respond to with available listings 140. If the data store 130 does not contain any listings 140 that are responsive to a particular user 105 request, then proxy server 120 generally will not deliver any listings 140 to the user 105, and that particular request is not included in the count of enabled search requests Er. Qs is calculated according to equation (12).

$$Qs = BC/Er \quad \text{Equation (12)}$$

In step 669, platform 110 calculates traffic source quality score (TQS) for a defined period of time based on Qs, Qc, a profit margin M, and a Volume V. Profit margin M with respect to a traffic source 145 is the amount of profit that advertising platform 110 makes with respect to that traffic source 145, e.g., according to an agreement between advertising platform 110 and that traffic source 145, or an advertiser 150. In the case that TQS is calculated for a group of traffic sources 145 or a partner set 190, profit margin M may be determined by, e.g., an average profit margin over all traffic sources 145 in the group or partner set 190, or by some other method. Volume V is a measure of the number of web pages 125 delivered through a traffic source 145, a group of traffic source 145, or a partner set 190.

TQS is calculated according to equation (13), in which each of w1-w4 are weighting factors, and each of which may be any positive or negative number or fraction of number selected to emphasize or deemphasize a particular term in equation (13).

$$TQS = (w1*Qs) + (ws*Qc) + (w3*M) + (w4*V)$$

After step 669, process 660 ends.

Figure 6D:
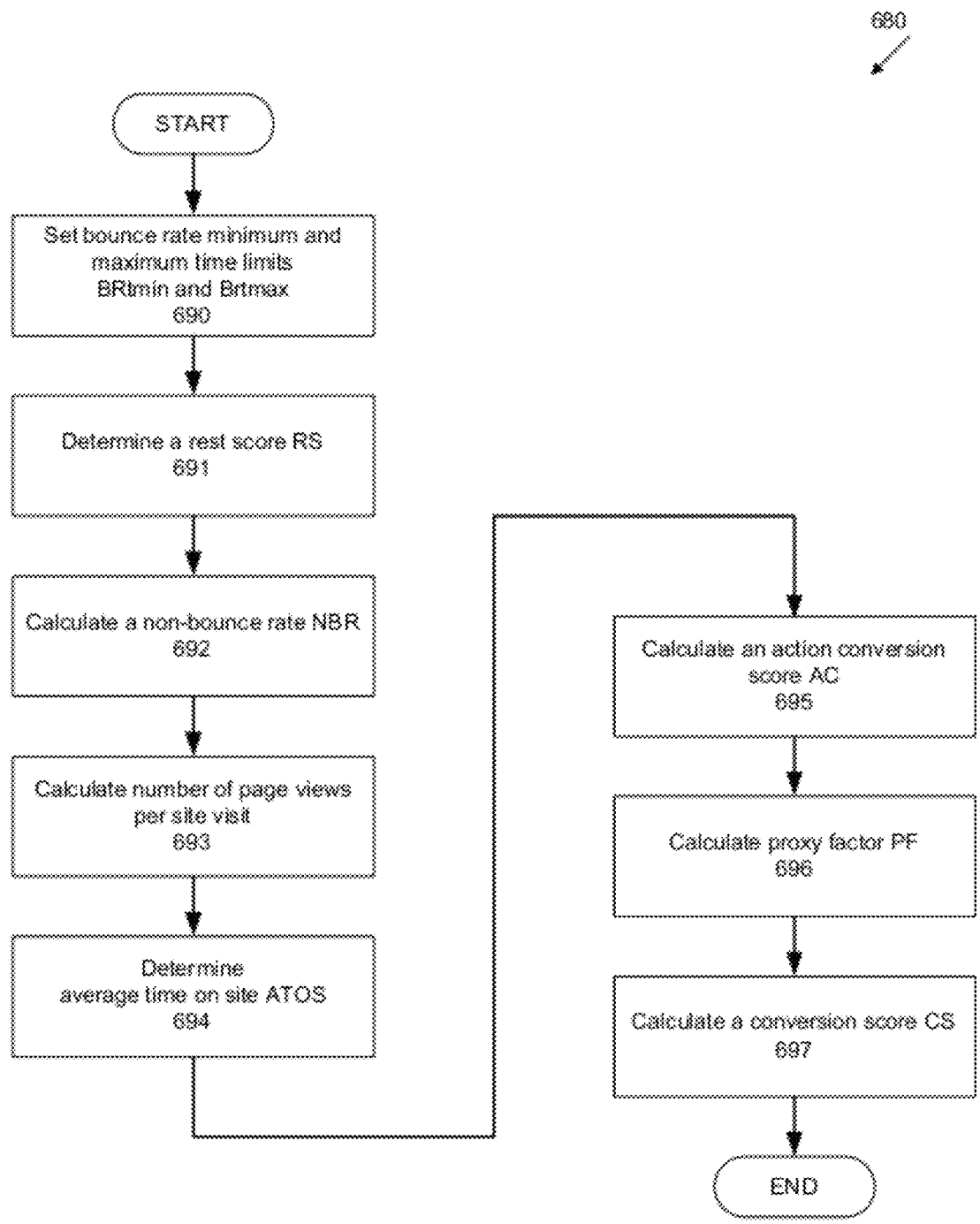
FIG. 6D illustrates an exemplary process for calculating a conversion score.

FIG. 6D illustrates in detail exemplary steps of calculating the conversion score CS discussed above with respect to step 666 of process 665. Process 661 starts at step 690.

In step 690, bounce rate minimum and maximum time limits, $BR_{tmin}$ and $BR_{tmax}$, respectively, are established. Alternatively, only a minimum bounce rate $BR_{tmin}$ is established. The minimum and maximum bounce rate may be predefined by the advertiser 150 or platform 110, and accessed at step 690. A bounce rate quantifies whether web pages have been viewed based on amounts of time that users 105 spend at the web pages under consideration. A bounce rate minimum time limit is a threshold, expressed in temporal units such as seconds, for determining whether a user 105 has viewed a web page for a long enough time such that the user 105 can be considered to be a viewer of that web page. The bounce rate maximum time limit is an upper bound for the calculation of a non-bounce rate (NBR), discussed below. The bounce rate maximum time limit may also be a threshold for determining that a user 105 is no longer using the device receiving web pages 125.

In step 691, platform 110 calculates a rest score (RS) indicating a number of users 105 in a predefined time period P that remained on a site for a duration between time limits BRtmin and BRtmax, and/or that took an action offered by the advertiser 150 web page 125. User 105 actions include clicking a hyperlink or a "submit" button, providing input in an HTML form, selecting a telephone number to dial, etc. Examples of other possible user actions are described above.

In step 692, platform 110 calculates a non-bounce rate (NBR) for a site over a time period P. NBR is a measure of what is sometimes referred to as site "stickiness," i.e., the amount of time that site visitors spend viewing sites delivered by a traffic source 145. NBR is based on visits to sites resulting from reverse proxy server 120 delivering web pages 125 in response to user 105 requests. NBR is calculated for period P according to equation (14).

$$NBR = RS/\text{visits} \quad \text{Equation (14)}$$

In step 693, platform 110 calculates a number of page views that users 105 made per visit to web sites, when the visit to a web site resulted from reverse proxy server 120 delivering a web page 125 in response to a user 105 request.

In step 694, platform 110 calculates an average time on site (ATOS), the average time that users 105 spent on web sites when the visit to the web site resulted from reverse proxy server 120 delivering a web page 125 in response to a user 105 request.

In step 695, platform 110 calculates an action conversion score (AC) based on the number of certain types of actions taken by users 105 per visit to web sites, when the visit to the web site resulted from reverse proxy server 120 delivering a web page 125 in response to a user 105 request. An action conversion score AC is calculated according to equation (15), in which each of w5-w7 are weighting factors, and each of which may be any positive or negative number or fraction of number selected to emphasize or deemphasize a particular term in equation (15).

$$AC = ((w5*\text{emails}) + (w6*\text{forms}) + (w7*\text{purchases}))/\text{visits} \quad \text{Equation (15)}$$

As illustrated above in equation (15), a calculation of an action conversion score includes the user 150 actions of sending emails, submitting forms and making purchases. However, an action conversion score may be based on other user 105 actions that may be tracked by platform 110 in addition to or in lieu of those illustrated in equation (15).

In step 696, platform 110 calculates a proxy factor PF. The proxy factor PF generally indicates the percent of delivered pages that are proxied by platform 110. PF is calculated by, e.g., dividing the number of proxied web pages displayed or otherwise shown to the user 105 by the number of user 105 clicks resulting in delivery of web pages.

In step 697, platform 110 calculates a conversion score (CS). CS is used in equation (13) for the calculation of the traffic source quality score (TQS). A conversion score is calculated according to equation (16), in which each of w8-w11 are weighting factors, and each of which may be any positive or negative number or fraction of number selected to emphasize or deemphasize a particular term in equation (16). In equation (16), in addition to the terms discussed above, "PPV" represents a number of page views per visit to a web site.

$$CS = PF*(w8*NBR) + (w9*PPV) + (w10*ATOS) + (w11*AC)) \quad \text{Equation (16)}$$

Process 661 ends after step 697.

As mentioned previously with respect to FIG. 5, and more specifically in the discussion above of step 525, platform 110 may limit delivery of listings 140 through one or more traffic sources 145 based on advertiser 150 budget allocations. A process and its subprocesses for determining budget allocations is illustrated in FIGS. 7-11, in which an advertiser 150 budget, e.g. a monetary or an activity budget, is distributed across some or all traffic sources 145. Budgets may be allocated to individual traffic sources 145, or may be allocated to groups of traffic sources 145 or partner sets 190, or to a combination of traffic sources 145, groups of traffic sources 145 or partner sets 190. A budget is generally specified for an accounting period. An accounting period may be specified in various ways, e.g., in units of time such as months, as a time between events, etc.

Figure 7:
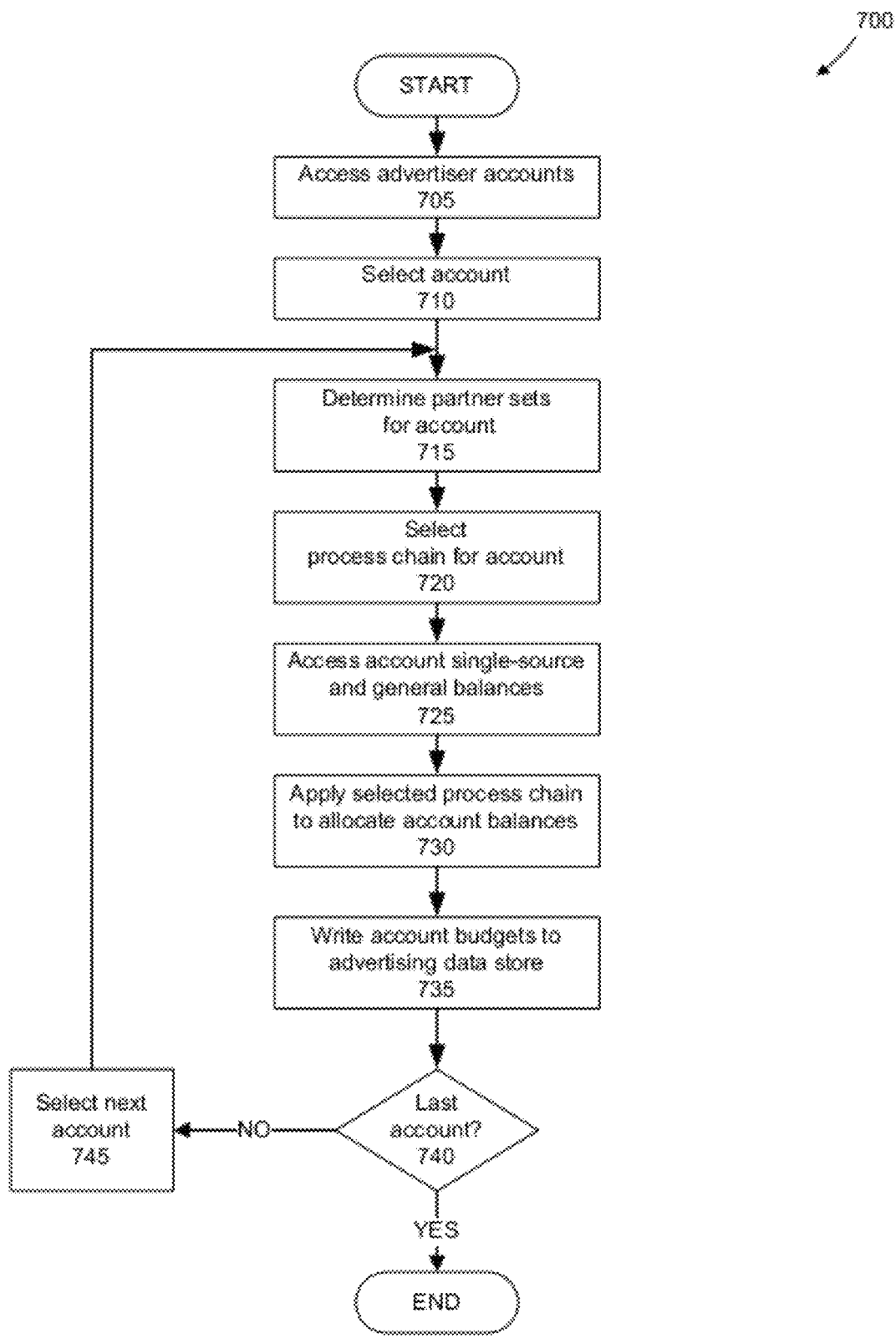
FIG. 7 illustrates an exemplary process for allocating budgets to partner sets.

FIG. 7 illustrates an exemplary process 700 for allocating budgets. Process 700 is described with respect to partner sets 190; however, process 700 generally may be performed with respect to any one of, or any group of, traffic sources 145. Process 700 generally considers a budget for an accounting period and an amount already spent during previous sub-periods in the accounting period. For example, the accounting period may be one month, and a sub-period one day. The sub-periods may, but need not be, equal or substantially equal in duration. Process 700 may be performed, e.g., hourly, daily, monthly, at random, or at arbitrary time periods. Process 700 begins with step 705.

In step 705, budget allocator 195 accesses advertiser 150 account, e.g., retrieves data from data store 130. Account data may include, by way of example, a number of listings 140 in data store 130 for each advertiser 150, account balances, tracking records 135, traffic source quality scores, and partner sets 190 allowed by advertiser 150 to deliver listings 140. Other account data may be associated with advertisers 150, and may be used to determine budget allocations.

Accessing account data may include retrieving all or some account data for each advertiser 150 or a subset of advertisers 150, accessing a list of software links to some or all advertisers 150, etc.

In step 710, budget allocator 195 selects a first account for processing, e.g., as is now described with respect to steps 715-735.

In step 715, budget allocator 195 determines which partner sets 190 have been previously selected for the advertiser 150 account by advertiser 150 or by platform 110 as partner sets 190 for which the traffic sources 145 are allowed to deliver advertiser 150 listings 140 to clients 105. The partner sets 190 selected for the account may be any number of the partner sets 190 available for selection from platform 110. Budget allocator 195 may select partner sets 190 to assign to an advertiser 150 account based upon criteria supplied by the advertiser 150, or by criteria used by platform 110 for all advertiser 150 accounts or for that advertiser 150 account.

In step 720, budget allocator 195 selects an appropriate process chain for determining budget allocations to apply to the advertiser 150 account. A process chain is a set of one or more processes, selected from an available set of processes, and then executed sequentially. For example, the set of processes could be included in one or more modules of computer-executable code. The process chain may include a single-source balance process, a targeting process, and a pacing process, among other processes. Thus, processes to be applied according to a process chain may be tailored for advertisers 150. Process chains are discussed further below with respect to FIG. 8. Further, single-source balance, targeting and pacing processes are described below with respect to FIGS. 9-11.

In step 725, budget allocator 195 accesses the account balance for the advertiser 150 account, including single-source balances and a general balance.

A single-source in the present context refers to a single traffic source 145 identified by advertiser 150 to be treated separately for purposes of budget allocation or for delivery of listings 140. An advertiser 150 may designate a single budget for one or more single-sources, or respective budgets for each of multiple single-sources. A single-source balance is a single-source budget for a certain time period, less the actual or estimated amount already spent in that time period for that single-source. A single-source may be treated as a partner set 190, i.e., a partner set 190 with only one member, in the following calculations.

The general balance accessed in step 725 is based on an advertiser 150 advertising budget balance for a certain time period for all partner sets 190 allowed by advertiser 150, less any single-source balances. The general balance is the general budget for a certain time period, less an actual or estimated amount already spent in that time period.

The actual or estimated amounts spent, used in determining the single-source balance and the general balance, may be determined, e.g., by data in activity records such as tracking records 135.

In step 730, budget allocator 195 applies the process chain selected in step 720 to allocate the single-source and general balances accessed in step 725 to the partner sets 190 determined in step 715. The process results in a budget allocation for the partner sets 190 associated with the advertiser 150 account. An exemplary process chain is described in detail below with respect to FIGS. 8-11.

In step 735, budget allocator 195 stores the budgets allocated in step 730 to the advertising data store 130. These budgets may then be used as one set of criteria in deciding whether to allow traffic sources 145 to deliver listings 140 to clients 105. After storing the budgets for the advertiser 150 account, process 700 is finished for that account.

In step 740, budget allocator 195 determines if there are as yet unprocessed accounts, from the accounts accessed in step

705, in which budgets should be allocated. If no, then process 700 ends. If yes, the process continues to step 745.

In step 745, budget allocator 195 selects the next account from the accounts accessed in step 705 and continues to step 715. Steps 715-735 are performed for each account accessed in step 705.

The steps of process 700 are presented in an exemplary order. Alternative ordering may be applied, for example, by determining budget allocations for all advertisers 150 in steps 715-730, and then writing all budget allocations to data store 130 at once, in step 735. By way of further example, process 700 may be applied first to single-source balances for all advertiser 150 accounts, and then applied to general balances for all advertiser 150 accounts, wherein step 735, writing budgets to data store 130, is performed at any point or points in the processes.

Figure 8:
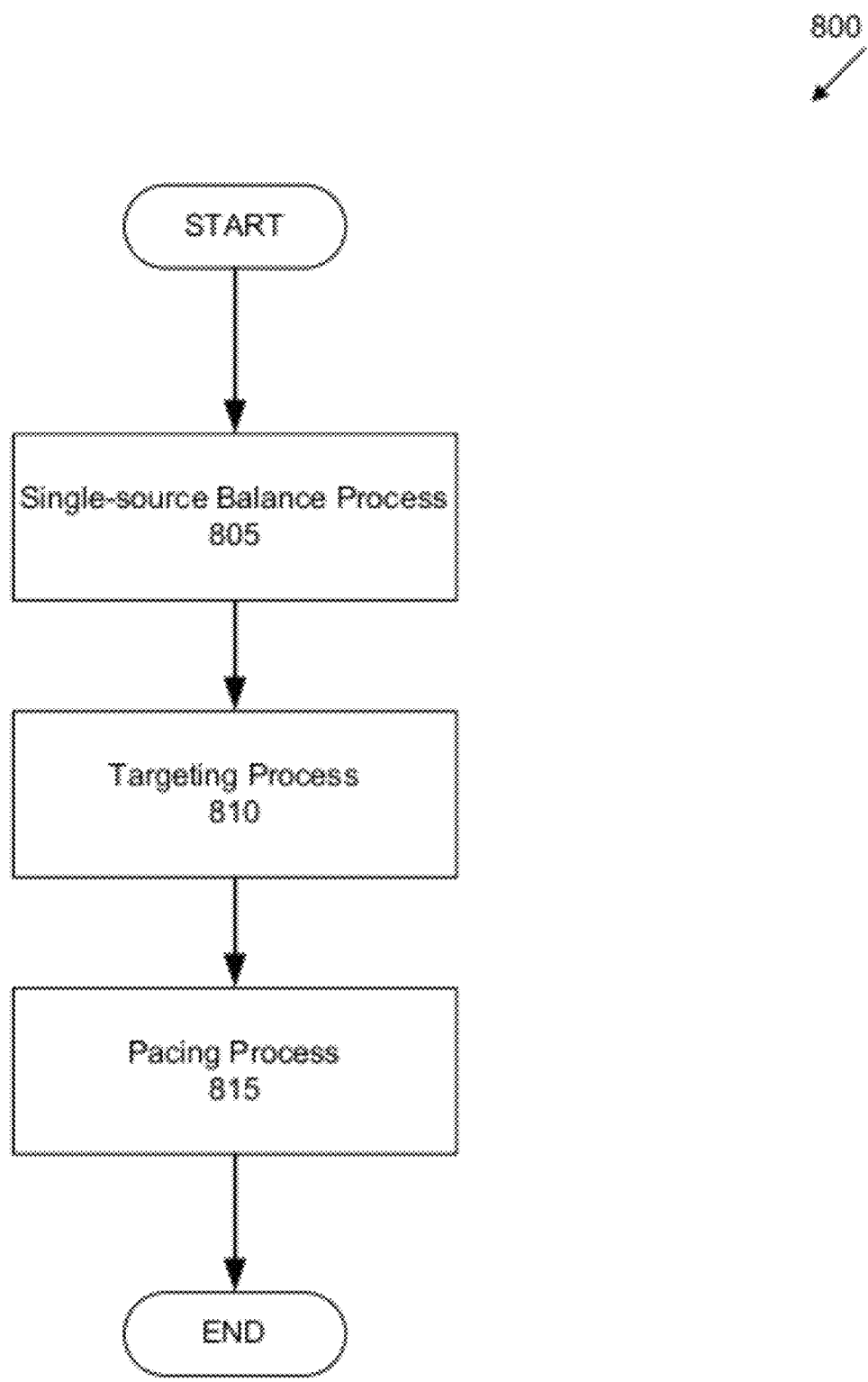
FIG. 8 illustrates an exemplary process chain to use for allocating budgets to partner sets.

FIG. 8 illustrates an exemplary process chain 800. A process chain may include one or multiple iterations of any of one or more processes, as mentioned above. The individual processes in the process chain may be performed independently of the other processes in the chain. Process chain 800 begins at step 805.

In step 805, budget allocator 195 performs a single-source balance process, which associates specific single-source account balances with specific partner sets 190 in an advertiser 150 account, as described further below with respect to FIG. 9.

In step 810, budget allocator 195 performs a targeting process, which allocates advertiser 150 account balances to the partner sets 190 in the account, as described below with respect to FIGS. 10A-10D.

In step 815, budget allocator 195 performs a pacing process, which further allocates the partner set 190 balances from step 810 to specific sub-periods of an accounting period, as described below with respect to FIGS. 11A-11B.

Figure 9:
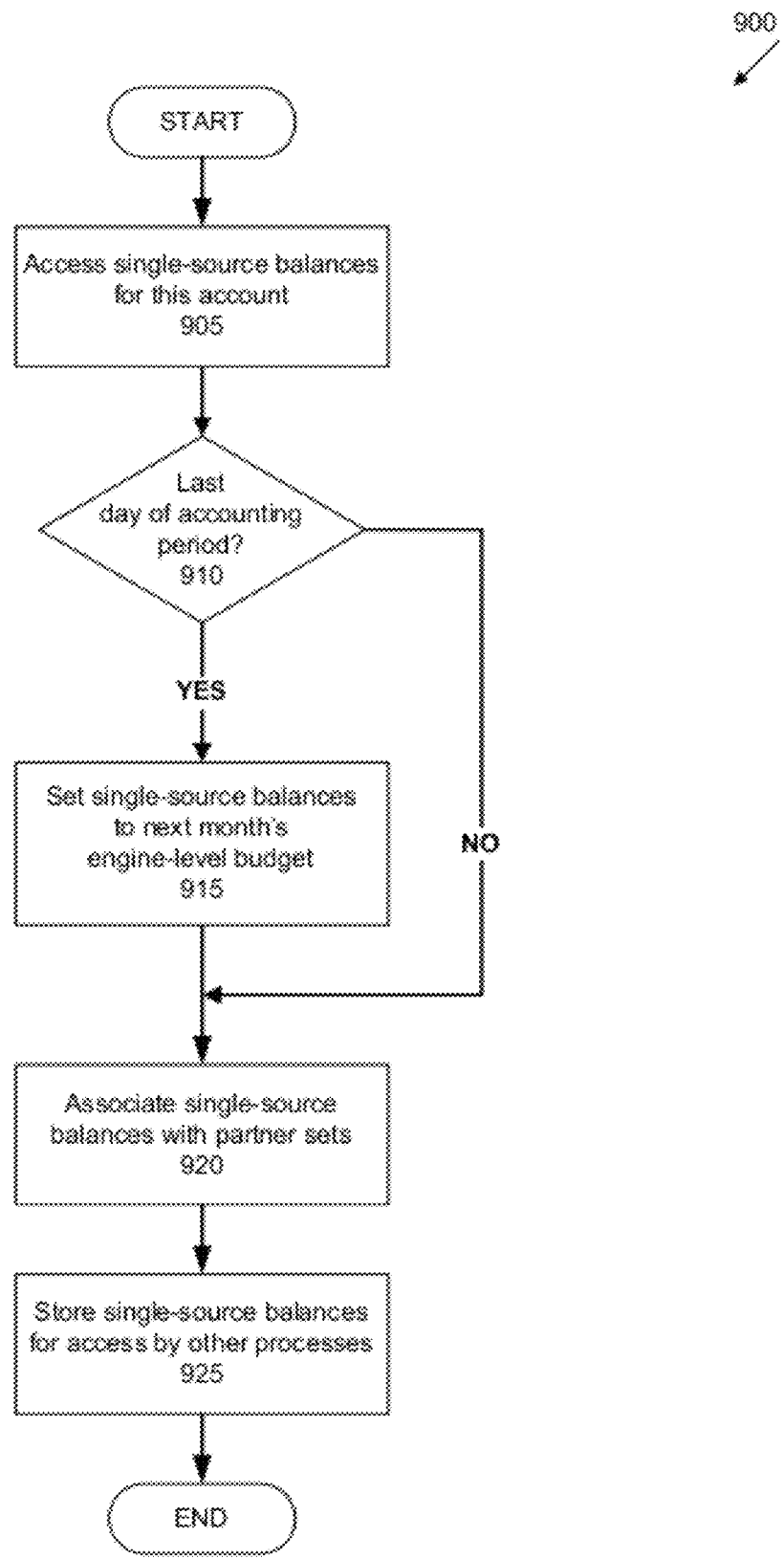
FIG. 9 illustrates an exemplary process for determining a single-source balance.

FIG. 9 illustrates single-source balance process 900, mentioned above with respect to step 805. The single-source balance process 900 identifies partner sets 190 for which single-source balances should be used. As discussed above, a single-source balance is a budget for a single traffic source 145 for a certain time period, less the actual or estimated amount already spent in that time period for that single traffic source 145. Process 900 begins at step 905.

In step 905, budget allocator 195 accesses single-source balances, e.g., from data store 130 for the advertiser 150 account being processed. Accessing a single-source balance may include retrieving single-source balances for the account, accessing a list of software links to some or all single-source balances for the account, etc.

In step 910, budget allocator 195 determines if the current sub-period is the last sub-period of an accounting period for the advertiser 150 account. If it is the last sub-period of the accounting period, process 900 continues at step 915. Otherwise, process 900 continues at step 920.

In step 915 budget allocator 195 replaces the single-source balance accessed in step 905 with the budget allocated by advertiser 150 to the single-source traffic source 145 for the next accounting period. To complete this step, the single-source budget for the next accounting period may be retrieved, e.g., from data store 130.

In step 920, budget allocator 195 associates each single-source balance from step 905 or step 915 with a single-source partner set 190.

In step 925, budget allocator 195 stores the association of the single-source balances and partner sets 190 in the data store 130 for access by the other processes in process chain 800. Process 900 ends after step 925.

Figure 10A:
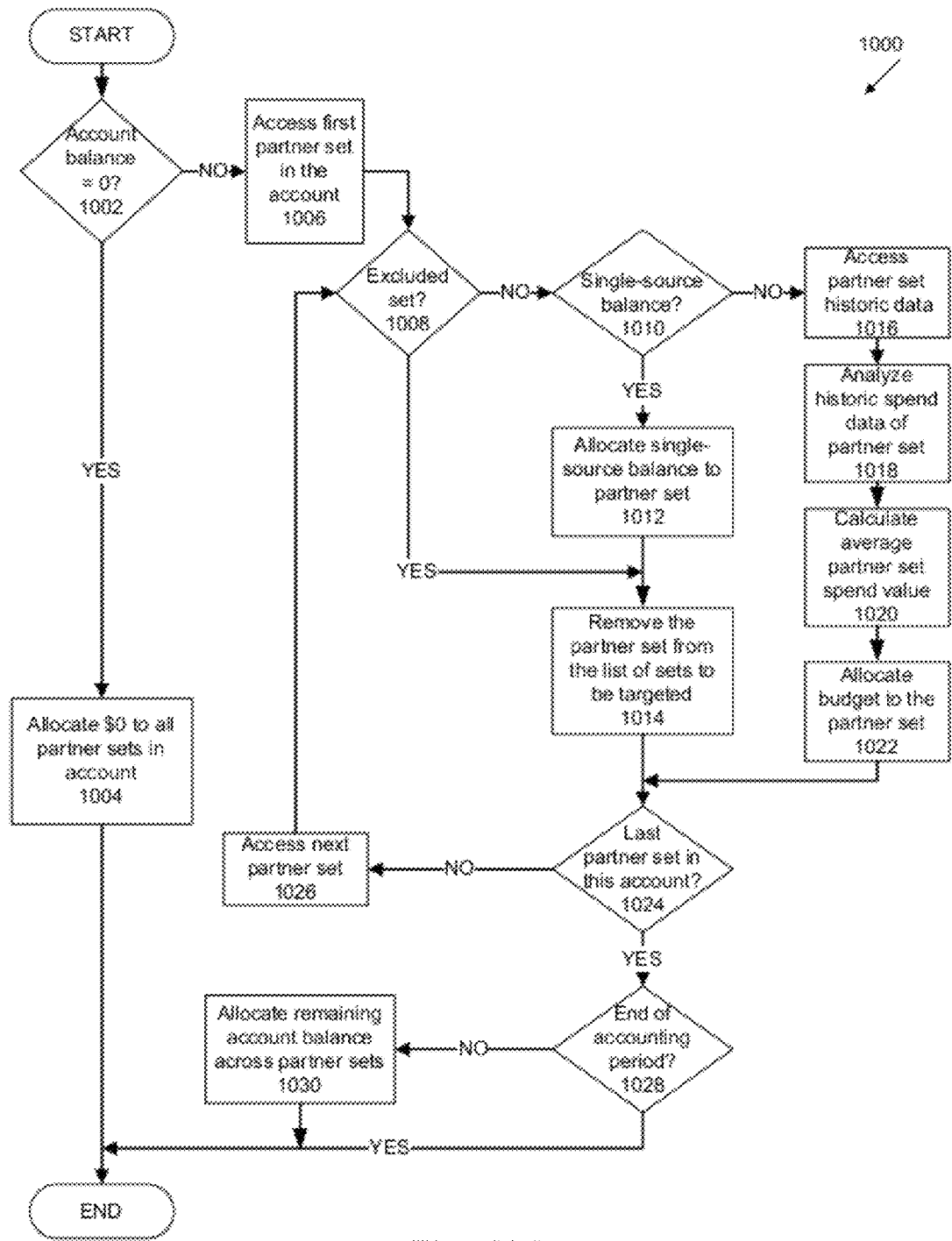
FIG. 10A illustrates an exemplary targeting process.

FIG. 10A illustrates targeting process 1000 for an advertiser 150 account of interest, mentioned with respect to step 810 in process chain 800.

As described above with respect to process 700 step 725, targeting process 1000 has access to the advertiser 150 account balance, including both the general balance and any single-source balances. Targeting process 1000 allocates the account balances for the accounting period to the partner sets 190 in the account. Then, a pacing process, described below with respect to FIGS. 11A and 11B, further allocates the partner set 190 balances to specific sub-periods in the accounting period. Process 1000 begins with step 1002.

In step 1002, budget allocator 195 checks to see if the account balance is zero or substantially equal to zero. Step 1002 illustrates an exemplary test for an account balance equal to exactly zero dollars ($0). However, any value beneath a predetermined threshold, could be deemed to be substantially equal to zero, for example, ≦$1000, ≦€1000, ≦£1000, ≦¥1000, etc. Alternatively, a threshold may be established in percentile form, for example, ≦5% of an accounting period budget. A threshold may also be determined based upon a formula, e.g., some formula related to number of partner sets 190, number of traffic sources 145, number of listings 140, tracking records 135, etc. In any case, if the account balance is determined to be zero or substantially equal to zero, process 1000 continues at step 1004. Otherwise, process 1000 continues at step 1006.

In step 1004, budget allocator 195 allocates a zero amount to each partner set 190 in the account, and process 1000 ends.

In step 1006, if the account balance as determined in step 1004 is not substantially equal to zero, budget allocator 195 accesses the first partner set 190 associated with the advertiser 150 account. Accessing a partner set 190 may include retrieving a list of partner sets 190 for the account, accessing a list of software links to some or all partner sets 190 for the account, etc., e.g., from data store 130.

In step 1008, budget allocator 195 determines if the partner set 190 accessed in step 1006 is an excluded partner set 190 for the account of interest. A partner set 190 may be excluded from an account if, for example, a sum or average of the quality scores for the individual traffic sources falls below a threshold, or the traffic quality score (TQS) falls below a threshold. A partner set 190 may be excluded for other reasons, such as low account balances. The advertiser 150 and platform 110 both may have criteria for excluding partner sets 190 from an account. If the partner set 190 is an excluded set, process 1000 continues with step 1014. If the partner set 190 is not an excluded set, process 1000 continues with step 1010.

In step 1010, if the partner set 190 was determined in step 1008 to not be excluded, budget allocator 195 checks to see if the partner set 190 was associated with a single-source balance in step 920 of process 900. If the partner set 190 is associated with a single-source balance, then process 1000 continues at step 1012. If not, process 1000 continues at step 1016.

In step 1012, if the partner set 190 was determined to be associated with a single-source balance in step 1010, budget allocator 195 allocates that single-source balance to the partner set 190.

In step 1014, the partner set 190 is removed from the list of partner sets 190 to be further processed by targeting process 1000. Step 1014 either follows from a decision in step 1008 that the partner set 190 is an excluded set, or follows from an allocation of a single-source balance to a partner set 190. Removal of a partner set 190 from the list of partner sets 190 may be implemented by storing, e.g., in a memory, the association of the partner set 190 and a single-source balance, if applicable, and then deleting the partner set 190 from a list of partner sets 190, or by marking the partner set 190 with an indication that the partner set 190 should not be used further in the targeting process, or by some other process for removing data from consideration in a process. Following step 1014, process 1000 continues at step 1024.

In step 1016, if it was determined in step 1010 that the partner set 190 was not to be associated with a single-source balance, budget allocator 195 accesses historic spend data for the partner set 190, e.g., from tracking records 135.

In step 1018, budget allocator 195 analyzes the historic spend data for the partner set 190, as described in detail below with respect to FIG. 10B.

In step 1020, budget allocator 195 calculates the average spend value for the partner set 190, as described in detail below with respect to FIG. 10C.

In step 1022, budget allocator 195 allocates a budget to the partner set 190, as described in detail below with respect to FIG. 10D.

In step 1024, following step 1014 or step 1022, budget allocator 195 determines whether the current partner set 190 was the last partner set 190 associated with the account of interest. If no, process 1000 continues with step 1026. If yes, process 1000 continues with step 1028.

In step 1026, budget allocator 195 accesses the next partner set 190 in the account of interest, and process 1000 continues at step 1008.

In step 1028, budget allocator 195 determines if it is the end of the accounting period. If yes, process 1000 ends. If no, then process 1000 continues with step 1030.

In step 1030, budget allocator 195 allocates any balance remaining in the general account for advertiser 150 across all partner sets 190 not associated with single-source balances. The allocation across the partner sets 190 may be an equal distribution or may be a distribution according to a formula defined by advertiser 150 or platform 110, such as a formula that weights the likelihood of distributions to a partner set 190 in exchange for fees from partners included in the partner set 190. After step 1030, process 1000 ends.

Figure 10B:
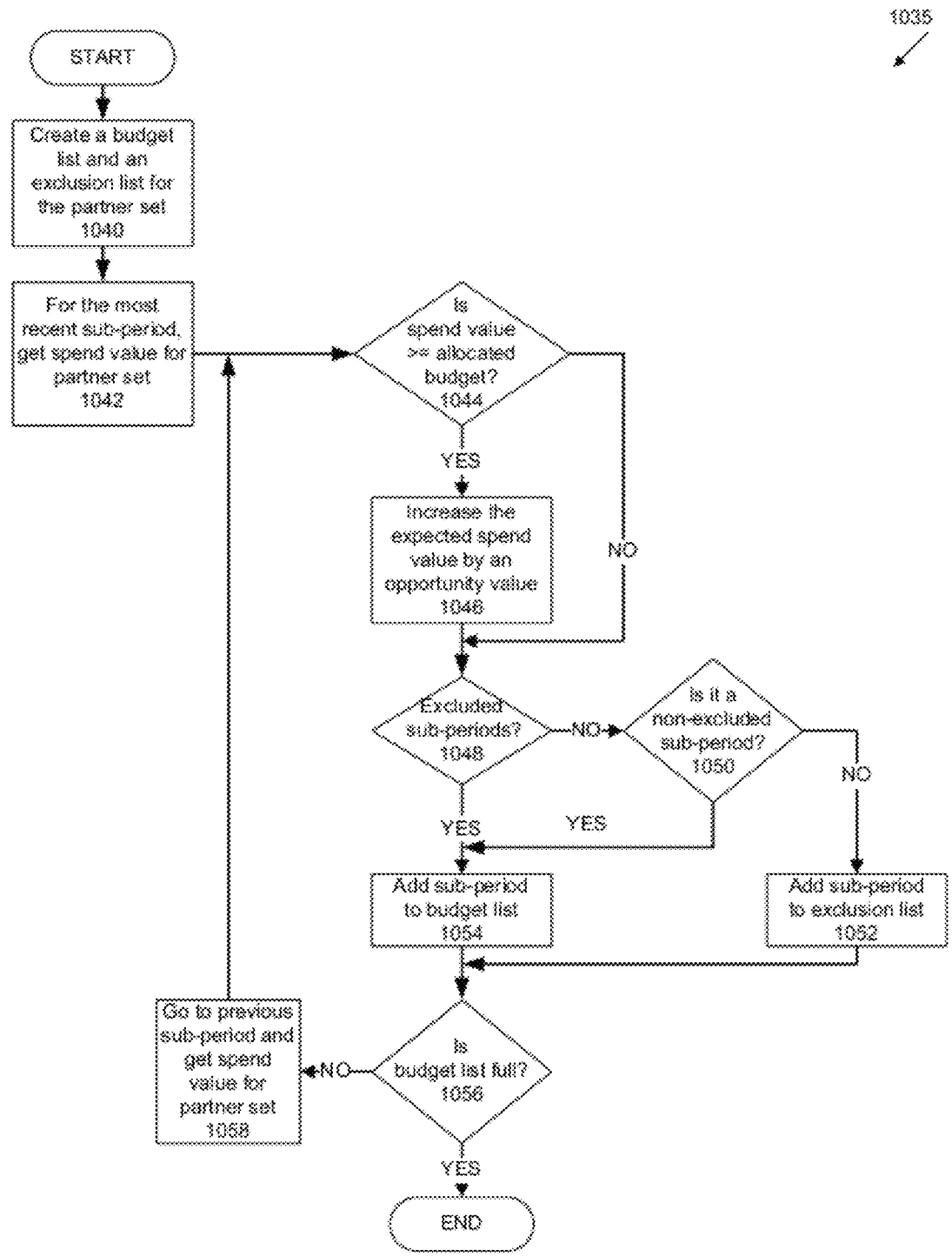
FIG. 10B illustrates an exemplary process for analyzing historical spend data.

FIG. 10B illustrates process 1035, which is a detailed description of step 1018 from process 1000. Process 1035 begins at step 1040.

In step 1040, budget allocator 195 creates two lists for use in processes 1035 and 1060, a primary list, sometimes labeled the budget list, and a secondary list, sometimes labeled the exclusion list. The budget list and the exclusion list each include one or more sub-periods for which historic spend data exists. The budget list includes a predefined number of sub-periods over which to determine an average spend value, described below. Sub-periods are excluded from the budget list if they do not meet the qualifications for being included in the budget list, for example, in an accounting period of a month, if the budget list is to contain only weekdays, then weekend days will be excluded from the budget list and added to the secondary list. Sub-periods excluded from the budget list are included in the exclusion list.

In step 1042, budget allocator 195 accesses, e.g., from another module in platform 110 or from data store 130, the spend value for the most recent sub-period. As discussed above, budget allocator 195 performs process 700, of which process 1035 is a sub-process, to calculate and allocate budgets across the partner sets 190 in an advertiser 150 account. The budget allocation is calculated for a subsequent sub-period of an accounting time period based on a budget for the time period and any budget already spent in previous sub-periods of the time period.

Spend value is an indication of client 105 activity resulting in a charge to an advertiser 150 account. Such activities may include, e.g., users 105 selecting a link on a proxied web page, such as an email address, telephone number, or request for more information, or users 105 filling out a form on a proxied web page. Spend value generally is calculated from some combination of data in tracking records 135. Spend value may be recorded in monetary units, but may also be recorded in other units as well. For example, spend value may be recorded as points in a point system. Spend value may be multiple values, such as a set of values in which each value represents one type of activity, e.g. clicking on a telephone number link.

In step 1044, budget allocator 195 determines if the spend value for the sub-period in question exceeded the budget previously allocated by the budget allocator 195 for that sub-period. If no, process 1035 continues at step 1048. If yes, process 1035 continues at step 1046. The previously-allocated budget may be one number, or may be a set of numbers representing budget allocations for different client 105 activity, e.g., clicking on a telephone number link.

In step 1046, if the spend value exceeded the previously allocated budget for the sub-period, the spend value to be used in the calculations of process 1060 is increased by an opportunity value. The opportunity value is one way for budget allocator 195 to provide an additional amount to a budget for a partner set 190 when the partner set 190 is outperforming the expectations set for it in a previous budget allocation. Step 1046 may increase the spend value by an opportunity value any time that a spend value exceeds an allocated budget. Alternatively, budget allocator 195 may increase the spend value by an opportunity value only after the spend value exceeds an allocated budget for a certain number of consecutive or non-consecutive sub-periods in an accounting period.

In step 1048, following step 1044 or 1046, budget allocator 195 determines whether there is a type of sub-period not to be used in creating the budget list, for example, weekend days. If there is not a defined type of sub-period to be excluded, process 1035 continues at step 1054. Otherwise, process 1035 continues at step 1050.

In step 1050, if there is a defined type of sub-period to be excluded, budget allocator 195 determines whether the sub-period in question is not of the type of sub-period to be excluded. If it is not of the type to be excluded, process 1035 continues at step 1054. Otherwise, process 1035 continues at step 1052.

In step 1052, the sub-period is added to the exclusion list. For example, if weekend days are a type of sub-period to be excluded, weekend days would be added to the exclusion list.

In step 1054, the sub-period, e.g., a weekday or set of weekdays, is added to the primary budget list.

In step 1056, budget allocator 195 determines whether there are a predetermined number of entries in the budget list. If yes, process 1035 ends. Otherwise, process 1035 continues at step 1058.

In step 1058, budget allocator 195 accesses the spend value for the partner set 190 under consideration for a previous sub-period. The previous sub-period typically will be the immediately preceding sub-period, but may be any prior sub-period not already analyzed by process 1035. Process 1035 then continues to step 1044.

Figure 10C:
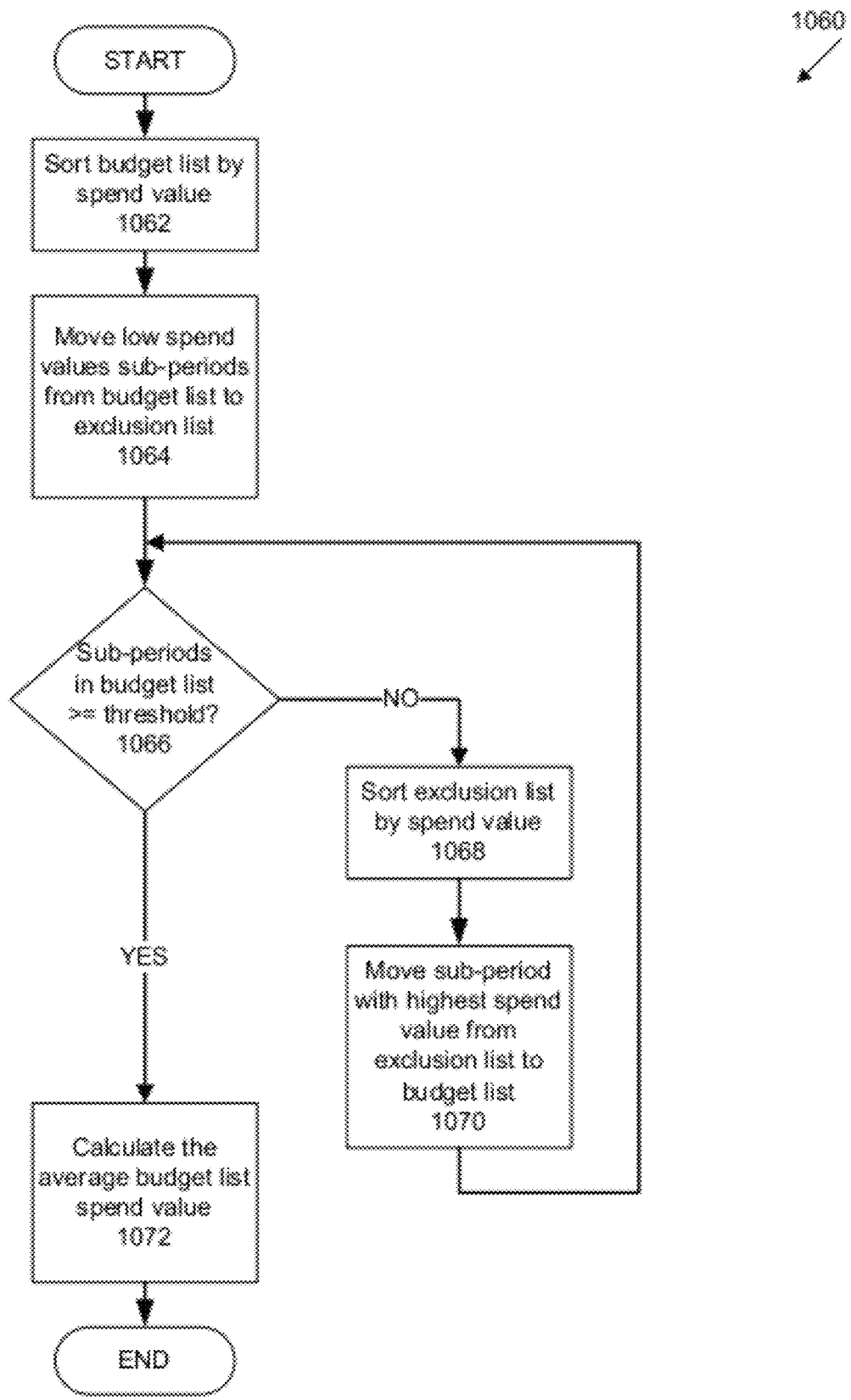
FIG. 10C illustrates an exemplary process for calculating an average spend value.

FIG. 10C illustrates process 1060, which is a detailed description of step 1020 from process 1000, the step of calculating the average spend value. Typically, process 1060 is executed following process 1035 and calculates the average spend value based on the budget list and exclusion list from process 1035.

In step 1062, budget allocator 195 sorts the budget list by spend value. As discussed above with respect to step 1042, spend value may be a single value, a set of values, etc.

In step 1064, budget allocator 195 moves low spend value sub-periods in the sorted budget list to the exclusion list for the account of interest. Low spend value sub-periods may be determined by comparing the spend values to a threshold, by selecting a lowest percentile of the sub-periods from the budget list, or by selecting a certain number of sub-periods from the budget list.

In step 1066, budget allocator 195 determines whether the number of sub-periods in the budget list exceeds a minimum threshold. The minimum threshold is generally established according to a minimum number of sub-periods for use in calculating an average spend value that provides a statistically reliable average value. If the number of sub-periods exceeds the threshold, process 1060 continues with step 1072. Otherwise, process 1060 continues with step 1068.

In step 1068, budget allocator 195 sorts the exclusion list, to generate an ordered list of excluded sub-periods by spend value.

In step 1070, budget allocator 195 moves the day with the highest spend value from the exclusion list to the budget list. Process 1060 continues at step 1066. Budget allocator 195 repeats steps 1068 and 1070 as many times as necessary until the budget list is full, e.g., contains a predetermined number of sub-periods. When the budget list is full as determined in step 1066, process 1060 continues with step 1072.

In step 1072, budget allocator 195 calculates the average of the spend values in the budget list. After step 1072, process 1060 ends.

Figure 10D:
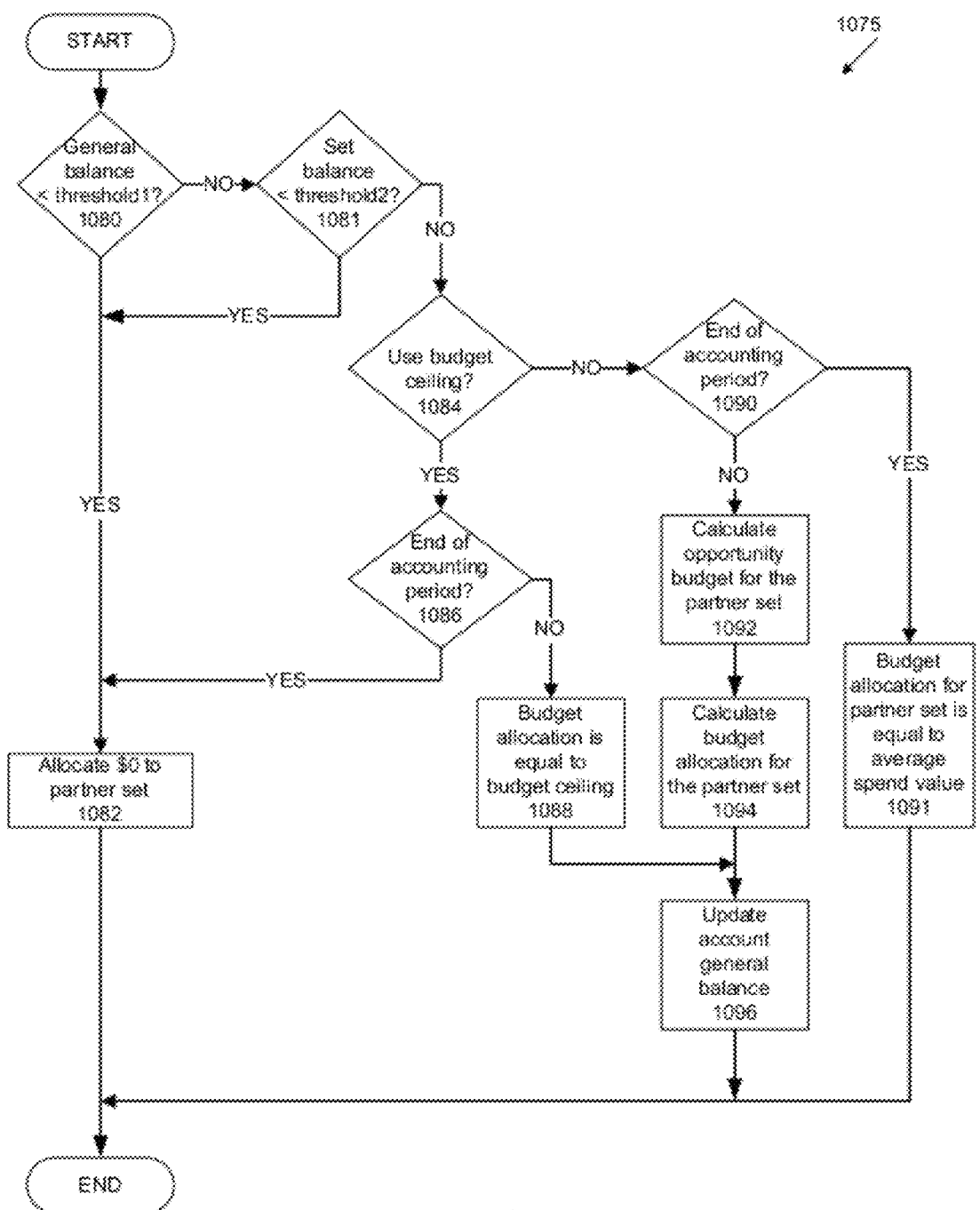
FIG. 10D illustrates an exemplary process for allocating a budget to a partner set.

FIG. 10D illustrates process 1075, which is a detailed description of step 1022 from process 1000, the step of allocating a portion of the general budget for the account of interest to a partner set 190. Process 1075 begins with step 1080.

In step 1080, budget allocator 195 determines if the general balance is below a first predetermined threshold. The first threshold is for the advertiser 150 account. The general balance may be below a threshold because budget was already allocated to other partner sets 190 previously, using up the majority of the available budget. If the general balance is below the threshold, process 1075 continues with step 1082. Otherwise, process 1075 continues with step 1081.

In step 1081, budget allocator 195 determines if the general balance is below a second predetermined threshold. The second threshold is for the particular partner set 190. If the general balance is below the threshold, process 1075 continues with step 1082. Otherwise, process 1075 continues with step 1084.

For simplicity, steps 1080 and 1081 are illustrated each using one threshold. However, steps 1080 and 1081 may include multiple threshold tests, comparing the general balance to various minimums.

In step 1082, if the general balance was below the first or second threshold as determined in step 1080 or step 1081, budget allocator 195 allocates a zero amount to the partner set 190, and process 1075 ends.

In step 1084, if the general balance is above the first and second thresholds, then budget allocator 195 determines whether the partner set 190 is marked to use a budget ceiling. A budget ceiling is a predefined budget amount associated with the partner set 190. The budget ceiling may be predefined as a set amount to allocate to a partner set 190, instead of completing the remaining accounting period allocation steps of process 1075. If a budget ceiling is not to be used, process 1075 continues with step 1090. Otherwise, process 1075 continues with step 1086.

In step 1086, budget allocator 195 determines if it is the end of the accounting period. If not, process 1075 continues at step 1088. Otherwise, process 1075 continues at step 1082, where a zero amount is allocated to the partner set 190, as described above, and process 1075 ends.

In step 1088, if a budget ceiling is specified, and it is not the end of the accounting period, budget allocator 195 allocates the amount specified as the budget ceiling to the partner set 190, and the process continues at step 1096.

In step 1090, if no budget ceiling is specified, budget allocator 195 determines if it is the end of the accounting period. If not, process 1075 continues with step 1092. Otherwise, process 1075 continues with step 1091.

In step 1091, if it is the end of the accounting period, budget allocator 195 sets the budget allocation for the partner set 190 to the average spend value determined in step 1072 of process 1060. Process 1075 ends after step 1091.

In step 1092, if no budget ceiling is specified and it is not the end of the accounting period, process 1075 calculates an opportunity budget for the partner set 190. An opportunity budget is an extra budgetary amount allocated to the partner set 190 if the partner set 190 exceeded the expectations set for it in one or more previous accounting sub-periods. The opportunity budget is added to the partner set 190 allocated budget to allow for a potential increase in traffic through the traffic sets 145 of the partner set 190. In this way, if the partner set 190 performs better than expected, the budget allocator 195 will take the increased performance allowed by an increased budget into account when allocating budget in the next run.

In step 1094, budget allocator 195 allocates a budget for the remaining portion of the accounting period to the partner set 190 based on the average spend value of the partner set 190. Average spend value may be calculated, e.g., as described above with respect to process 1060 as illustrated in FIG. 10C. The budget allocation determined in step 1094 may be as simple as setting the accounting period budget to the average spend value multiplied by the number of sub-periods left in the accounting period. Alternatively, additional calculations may be performed to determine the budget allocation, with average spend value being only one variable in the calculations. Other variables may include, e.g., a bonus based on a fee or a promotional discount for the partner set 190. For example, a special bonus period partner set 190 may include only partners that paid a fee to be members in the special partner set 190 during the bonus period. In this case, the budget allocation may include an amount equal to the bonus promised when the fee was paid.

In step 1096, following budget allocation determined in steps 1088 or 1094, budget allocator subtracts the amount allocated to the partner set 190 from the general balance, leaving an amount in the general balance to allocate to the remaining partner sets 190. Following step 1096, process 1075 ends.

Figure 11A:
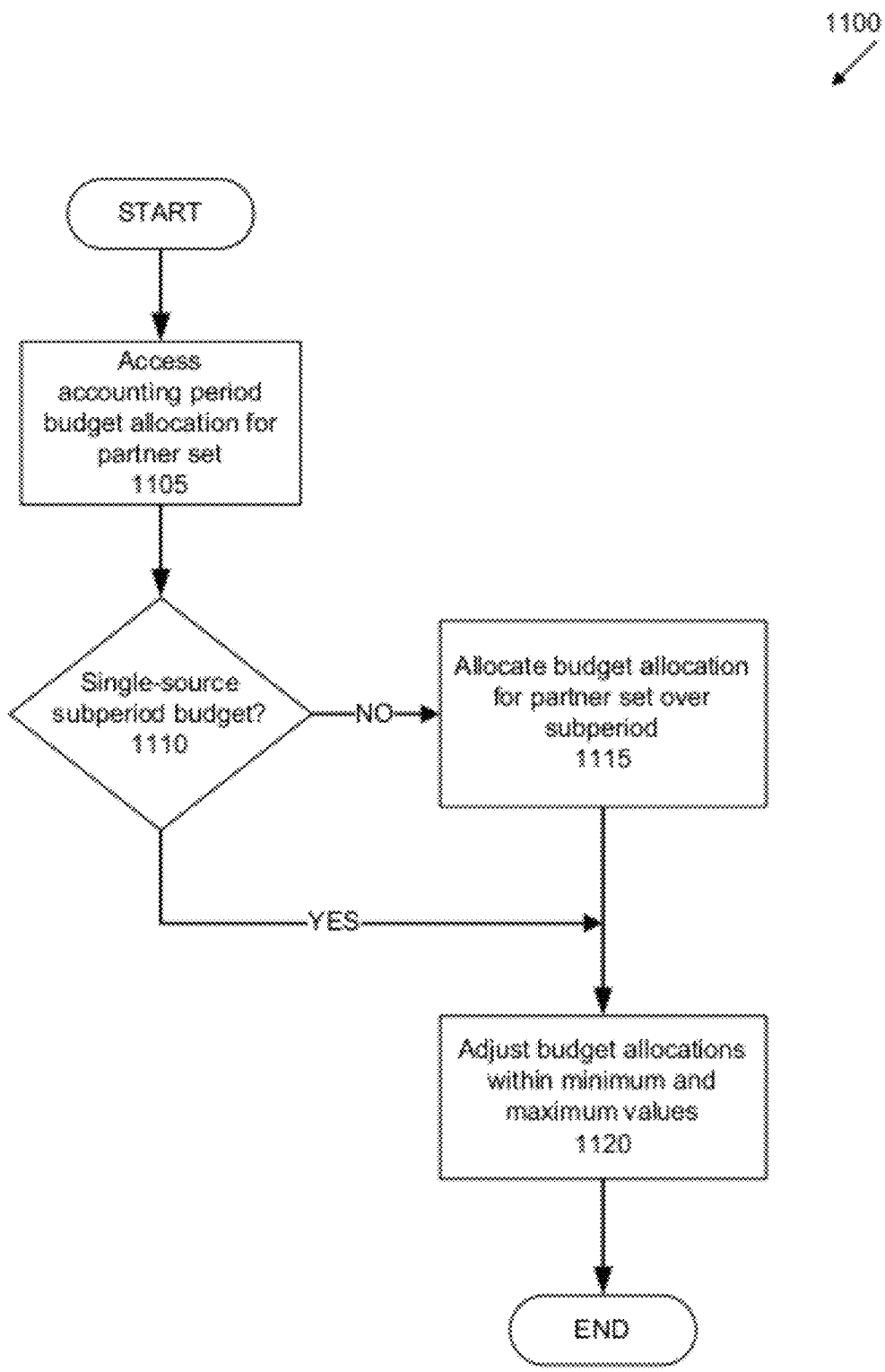
FIG. 11A illustrates an exemplary pacing process.

FIG. 11A illustrates pacing process 1100, mentioned in step 815 in process chain 800. In process 1075 as described above, budget allocator 195 determined a budget allocation for the remaining portion of the accounting period. Pacing refers to further allocating the budget across the remaining sub-periods in the accounting period. Process 1100 begins at step 1105.

In step 1105, budget allocator 195 accesses the accounting period budget allocation, as determined in process 1075, for the partner set 190 under consideration. Accessing the budget allocation may include retrieving budget data from data store 130, accessing a software link to the data, etc.

In step 1110, budget allocator 195 determines if the partner set 190 is a single-source set with a predetermined sub-period single-source budget. If yes, process 1100 continues with step 1120. If no, process 1100 continues with step 1115.

In step 1115, if there was no sub-period single-source budget for the partner set 190, budget allocator 195 divides the accounting period budget allocation accessed in step 1105 by the number of sub-periods remaining in the accounting period. The number of sub-periods is determined as shown below with reference to process 1130 or 1180 in FIGS. 11B and 11C, respectively. The result of the division is the budget allocation for each of the sub-periods remaining in the accounting period. The sub-period budget allocations, as well as the accounting period budget allocations, in addition to being used to limit delivery of listings 140 through traffic sources 145 as described above, may be used for setting a fee structure for advertisers 150, or for negotiating with advertisers 150.

In step 1120, after a sub-period budget allocation is determined in step 1110 or step 1115, budget allocator 195 adjusts the allocated sub-period budget as necessary so it is between a maximum and minimum limit. If the allocated budget is over the maximum limit, then the budget allocation is set to the maximum limit. If the allocated budget is below the minimum limit, then the budget allocation is set to the minimum limit. Following step 1120, process 1100 ends.

Figure 11B:
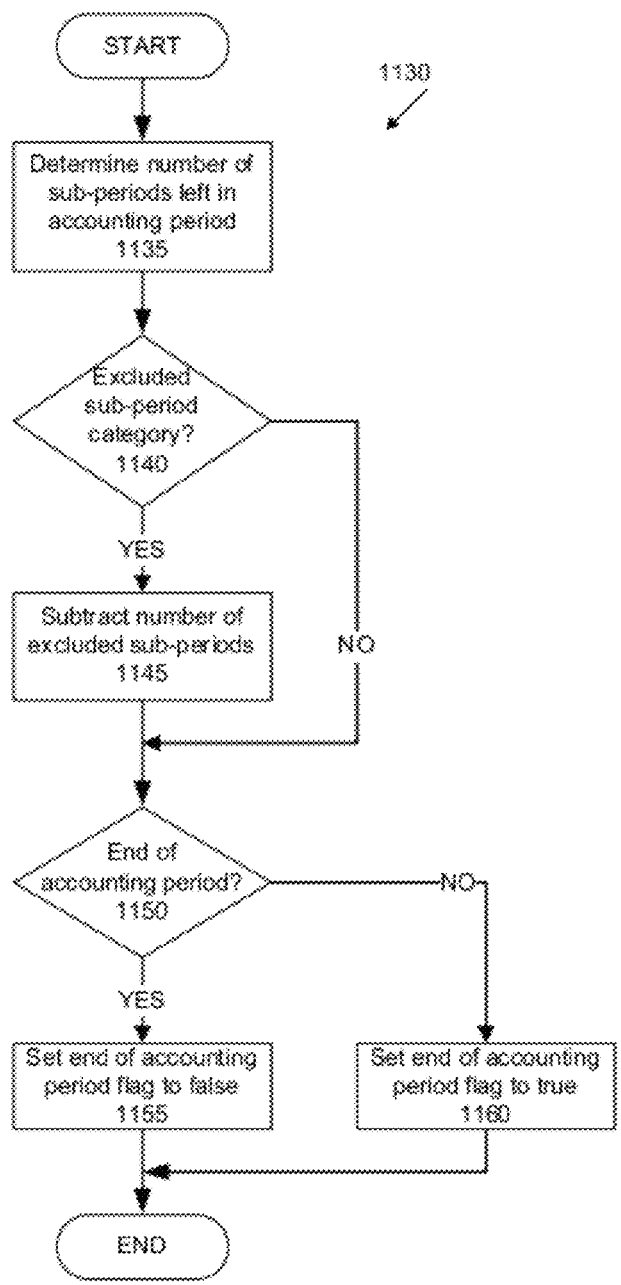
FIG. 11B illustrates an exemplary process for determining a sub-period over which to allocate a budget.
Figure 11C:
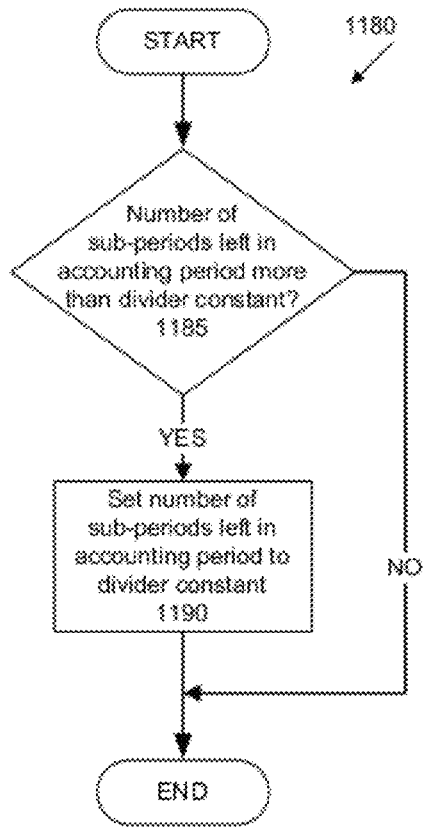
FIG. 11C illustrates an exemplary calculation related to determining a sub-period, e.g., as illustrated in FIG. 11B.

FIGS. 11B and 11C illustrate one method for determining the number of sub-periods remaining in an accounting period.

FIG. 11B illustrates a process 1130 for calculating the number of sub-periods left in an accounting period. The number of sub-periods is used in process 1100 step 1115, as illustrated in FIG. 11A. Process 1130 is illustrated in terms of sub-periods of days in an accounting period of one month. Process 1130 begins at step 1135.

In step 1135, budget allocator 195 determines the number of sub-periods left in the current accounting period.

In step 1140, budget allocator 195 determines if there are any excluded categories to be used in allocating budgets. If not, process 1130 continues with step 1150. If so, process 1130 continues with step 1145.

In step 1145, the number of excluded sub-periods left in the accounting period is subtracted from the number of sub-periods left in the accounting period as determined in step 1135.

In step 1150, budget allocator 195 determines if it is the end of the accounting period. If so, process 1130 continues at step 1160. Otherwise, process 1100 continues with step 1155.

In step 1155, budget allocator 195 sets an end of accounting period flag to true. The flag is used by other processes in determining the appropriate steps to follow.

In step 1160, if it is not the end of the accounting period, budget allocator 195 sets the end of accounting period flag to false.

Following step 1155 or 1160, process 1130 ends.

FIG. 11C illustrates an optional additional process 1180 following process 1130 for calculating the number of sub-periods used in a pacing process 1100. Process 1180 begins at step 1185.

In step 1185, budget allocator 195 determines if the number of sub-periods determined in process 1130 is greater than a divider constant. If yes, then process 1180 continues at step 1190. Otherwise, process 1180 ends.

In step 1190, if the number of sub-periods determined in process 1130 exceeds the divider constant, budget allocator 195 sets the number of sub-periods used in process 1100 to the divider constant. Following step 1180, process 1190 ends.

CONCLUSION

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    tracking user actions responsive to a plurality of web pages;
    creating a plurality of records in a data store, the records including the tracked user actions;
    calculating, in a computing device, a conversion score for each of a plurality of traffic sources, each of the traffic sources including an interface for submitting search queries and thereby referring web site traffic, the conversion scores based at least in part on the tracked user actions;
    calculating a traffic source quality score for each of the plurality of traffic sources;
    generating a ranking of the plurality of traffic sources based at least in part on the traffic source quality scores; and
    allocating the traffic sources to two or more traffic source sets based at least in part on the ranking, wherein at least one of the traffic source sets includes a plurality of traffic sources.

2. The method of claim 1, further comprising calculating a conversion score including dividing a number of times that users viewed web pages for more than a minimum amount of time by a number of times that web pages were provided to the users.

3. The method of claim 1, further comprising calculating a conversion score including calculating a number of web pages viewed by users per visit to a web site.

4. The method of claim 1, further comprising calculating a conversion score including calculating an average time that users viewed a web site.

5. The method of claim 1, further comprising calculating a conversion score including calculating a percentage of user selections, from web pages delivered to users via at least one traffic source, that resulted in the delivery of proxied web pages to the users.

6. The method of claim 1, wherein the traffic source quality score is based in part on the conversion score.

7. The method of claim 1, further comprising allocating the traffic sources to one or more traffic sets being based at least in part on receiving a fee from at least one traffic source.

8. The method of claim 1, the traffic source sets being used for at least one of tracking traffic sources in a traffic source set as a unit and grouping traffic sources according to one or more common characteristics.

9. A computer readable medium, having instructions tangibly embodied thereon, the instructions executable by a processor, the instructions comprising instructions for:
tracking user actions responsive to a plurality of web pages;
creating a plurality of records in a data store, the records including the tracked user actions;
calculating a conversion score for each of a plurality of traffic sources, each of the traffic sources including an interface for submitting search queries and thereby referring web site traffic, the conversion score based at least in part on the tracked user actions;
calculating a traffic source quality score for each of the plurality of traffic sources;
generating a ranking of the plurality of traffic sources based at least in part on the traffic source quality scores; and
allocating the traffic sources to two or more traffic source sets based at least in part on the ranking, wherein at least one of the traffic source sets includes a plurality of traffic sources.

10. The computer readable medium of claim 9, wherein calculating a conversion score includes dividing a number of times that users viewed web pages for more than a minimum amount of time by a number of times that web pages were provided to the users.

11. The computer readable medium of claim 9, wherein calculating a conversion score includes calculating a number of web pages viewed by users per visit to a web site.

12. The computer readable medium of claim 9, wherein calculating a conversion score includes calculating an average time that users viewed a web site.

13. The computer readable medium of claim 9, wherein calculating a conversion score includes calculating a percentage of user selections, from web pages delivered to users via at least one traffic source, that resulted in the delivery of proxied web pages to the users.

14. The computer readable medium of claim 9, wherein the traffic source quality score is based in part on the conversion score.

15. The computer readable medium of claim 9, wherein allocating the traffic sources to one or more traffic sets is based at least in part on receiving a fee from at least one traffic source.

16. The computer readable medium of claim 9, the instructions further comprising instructions to use the traffic source sets for at least one of tracking traffic sources in a traffic source set as a unit and grouping traffic sources according to one or more common characteristics.

17. A system comprising: a server that includes computer hardware configured to
track user actions responsive to a plurality of web pages;
create a plurality of records in a data store, the records including the tracked user actions;
calculate a conversion score for each of a plurality of traffic sources, each of the traffic sources including an interface for submitting search queries and thereby referring web site traffic, the conversion score based at least in part on the tracked user actions;
calculate a traffic source quality score for each of the plurality of traffic sources;
generate a ranking of the plurality of traffic sources based at least in part on the traffic source quality scores; and
allocate the traffic sources to two or more traffic source sets based at least in part on the ranking, wherein at least one of the traffic source sets includes a plurality of traffic sources.

18. The system of claim 17, the server further configured to calculate the conversion score by dividing a number of times that users viewed web pages for more than a minimum amount of time by a number of times that web pages were provided to the users.

19. The system of claim 17, the server further configured to calculate the conversion score by calculating a number of web pages viewed by users per visit to a web site.

20. The system of claim 17, the server further configured to calculate the conversion score by calculating an average time that users viewed a web site.

21. The system of claim 17, the server further configured to calculate the conversion score by calculating a percentage of user selections, from web pages delivered to users via at least one traffic source, that resulted in the delivery of proxied web pages to the users.

22. The system of claim 17, the traffic source quality score based in part on the conversion score.

23. The system of claim 17, the server further configured to use the traffic source sets for at least one of tracking traffic sources in a traffic source set as a unit and grouping traffic sources according to one or more common characteristics.

* * * * *